United States Patent
Higuchi

(10) Patent No.: US 10,725,847 B2
(45) Date of Patent: Jul. 28, 2020

(54) MANAGEMENT APPARATUS AND MANAGEMENT METHOD

(71) Applicant: FUJITSU LIMITED, Kawasaki-shi, Kanagawa (JP)

(72) Inventor: Daisuke Higuchi, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 125 days.

(21) Appl. No.: 15/949,497

(22) Filed: Apr. 10, 2018

(65) Prior Publication Data

US 2018/0300196 A1 Oct. 18, 2018

(30) Foreign Application Priority Data

Apr. 17, 2017 (JP) ................. 2017-081231

(51) Int. Cl.
*G06F 11/00* (2006.01)
*G06F 11/07* (2006.01)
*G06F 16/23* (2019.01)
*G06F 11/14* (2006.01)

(52) U.S. Cl.
CPC ...... *G06F 11/0769* (2013.01); *G06F 11/0727* (2013.01); *G06F 11/14* (2013.01); *G06F 16/2365* (2019.01)

(58) Field of Classification Search
CPC ... G06F 11/0769; G06F 11/0727; G06F 11/14
See application file for complete search history.

(56) References Cited

U.S. PATENT DOCUMENTS

| 2004/0153719 A1 | 8/2004 | Achiwa et al. |
| 2007/0124342 A1 | 5/2007 | Yamamoto et al. |
| 2009/0125691 A1 | 5/2009 | Nakanishi |
| 2010/0191942 A1* | 7/2010 | Owaki .................. G06F 11/165 712/228 |
| 2011/0099420 A1 | 4/2011 | MacDonald McAlister et al. |
| 2016/0328303 A1* | 11/2016 | Brandner ............ G06F 11/1662 |
| 2018/0107566 A1* | 4/2018 | Hardy ................. G06F 11/0754 |

FOREIGN PATENT DOCUMENTS

| JP | 2004-206562 | 7/2004 |
| JP | 2005-293325 | 10/2005 |
| JP | 2009-122873 | 6/2009 |
| JP | 2016-85753 | 5/2016 |
| WO | 2007/063944 | 6/2007 |

OTHER PUBLICATIONS

USPTO—Lin—Non-Final Office Action dated Dec. 30, 2019 for U.S. Appl. No. 16/368,164 [pending].
U.S. Office Action dated May 1, 2020 for copending U.S. Appl. No. 16/368,164, 15 pages.

* cited by examiner

*Primary Examiner* — Katherine Lin
(74) *Attorney, Agent, or Firm* — Fujitsu Patent Center

(57) ABSTRACT

A management apparatus that manages a first database and a second database synchronized with each other includes a memory and a processor configured to perform a stop of synchronous processing between the first database and the second database in accordance with detection of a delay with respect to a first processing request received by the first database, output an error notification concerning uncompleted processing in the first database in which the delay is detected, and allocate a second processing request received after the detection to the second database.

15 Claims, 22 Drawing Sheets

FIG. 17

| ITEM NUMBER | MAIN SYSTEM DB | SUB-SYSTEM DB |
|---|---|---|
| 1 | 10.2.AA.BB | 10.2.AA.CC |

FIG. 18

| ITEM NUMBER | MAIN SYSTEM DB | SUB-SYSTEM DB |
|---|---|---|
| 1 | 10.2.AA.CC | − |

MANAGEMENT APPARATUS AND MANAGEMENT METHOD

CROSS-REFERENCE TO RELATED APPLICATION

This application is based upon and claims the benefit of priority of the prior Japanese Patent Application No. 2017-81231, filed on Apr. 17, 2017, the entire contents of which are incorporated herein by reference.

FIELD

The embodiments discussed herein are related to a management apparatus and a management method.

BACKGROUND

In a job system in which a database is used (hereinafter referred to as information processing system as well), for example, a provider that provides a service to users (hereinafter simply referred to as provider as well) constructs a job system including a database in which data used for the provision of the service to the users is stored.

The job system explained above includes, for example, besides a main system database (hereinafter referred to as first database as well), a sub-system database (hereinafter referred to as second database as well). For example, when detecting that a processing delay occurs in the main system database, the job system starts processing by the sub-system database instead of the main system database. Consequently, even when a predetermined abnormality occurs in the main system database, the job system is capable of continuing the provision of the service to the users.

Related art is disclosed in, for example, Japanese Laid-open Patent Publication Nos. 2005-293325 and 2016-085753 and International Publication Pamphlet No. WO 2007/063944.

SUMMARY

According to an aspect of the invention, a management apparatus that manages a first database and a second database synchronized with each other includes a memory and a processor configured to perform a stop of synchronous processing between the first database and the second database in accordance with detection of a delay with respect to a first processing request received by the first database, output an error notification concerning uncompleted processing in the first database in which the delay is detected, and allocate a second processing request received after the detection to the second database.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17 is a diagram for explaining a specific example of allocation information;

FIG. 18 is a diagram for explaining a specific example of the allocation information;

DESCRIPTION OF EMBODIMENTS

When starting processing by a sub-system database, for example, a job system stops a main system database. Specifically, the job system issues (transmits) an interrupt instruction to hardware configuring the main system database to stop the main system database. Consequently, the job system is capable of stopping resumption of processing by the main system database (resumption of processing unintended by a provider) and stopping occurrence of data destruction.

However, in the related art, for example, when the hardware configuring the main system database is not adapted to the interrupt instruction issued by the job system, the job system may not be able to stop the main system database according to the interrupt instruction to the hardware. Therefore, in this case, the job system has to start processing by the sub-system database without stopping the main system database. It is sometimes difficult to completely stop occurrence of data destruction.

[Configuration of Information Processing System]

Figure 1:
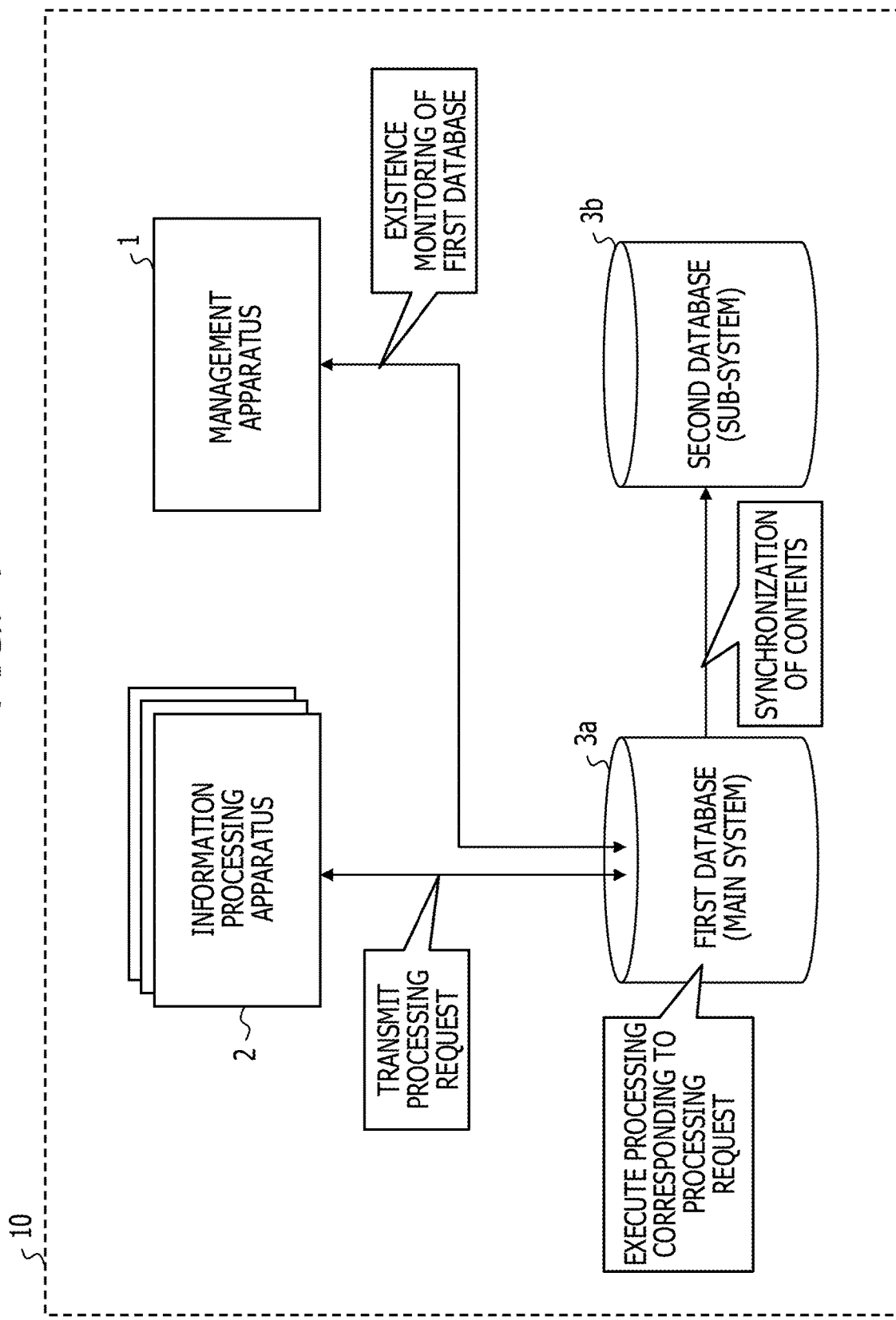
FIG. 1 is a diagram illustrating the configuration of an information processing system.
Figure 2:
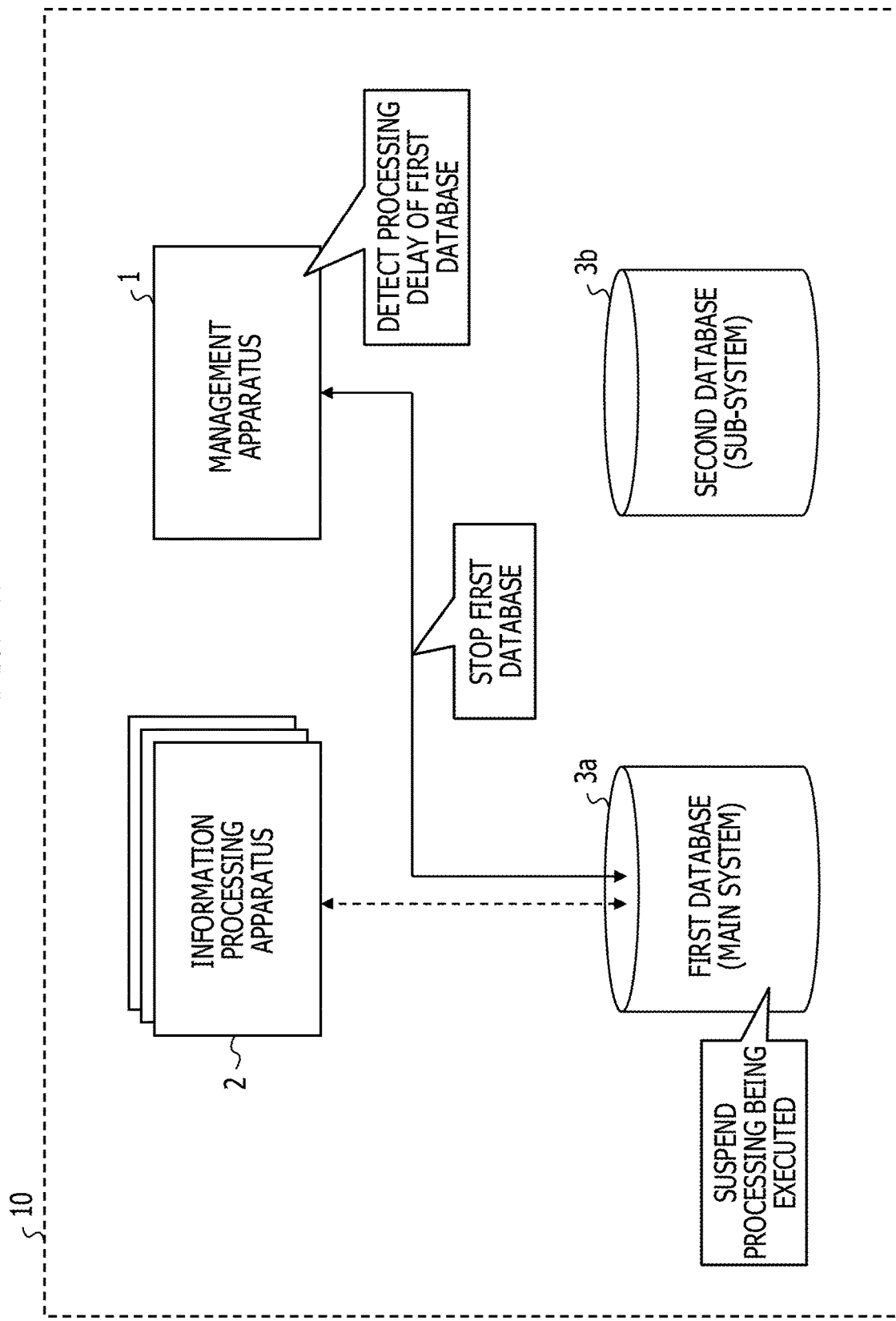
FIG. 2 is a diagram illustrating the configuration of the information processing system.
Figure 3:
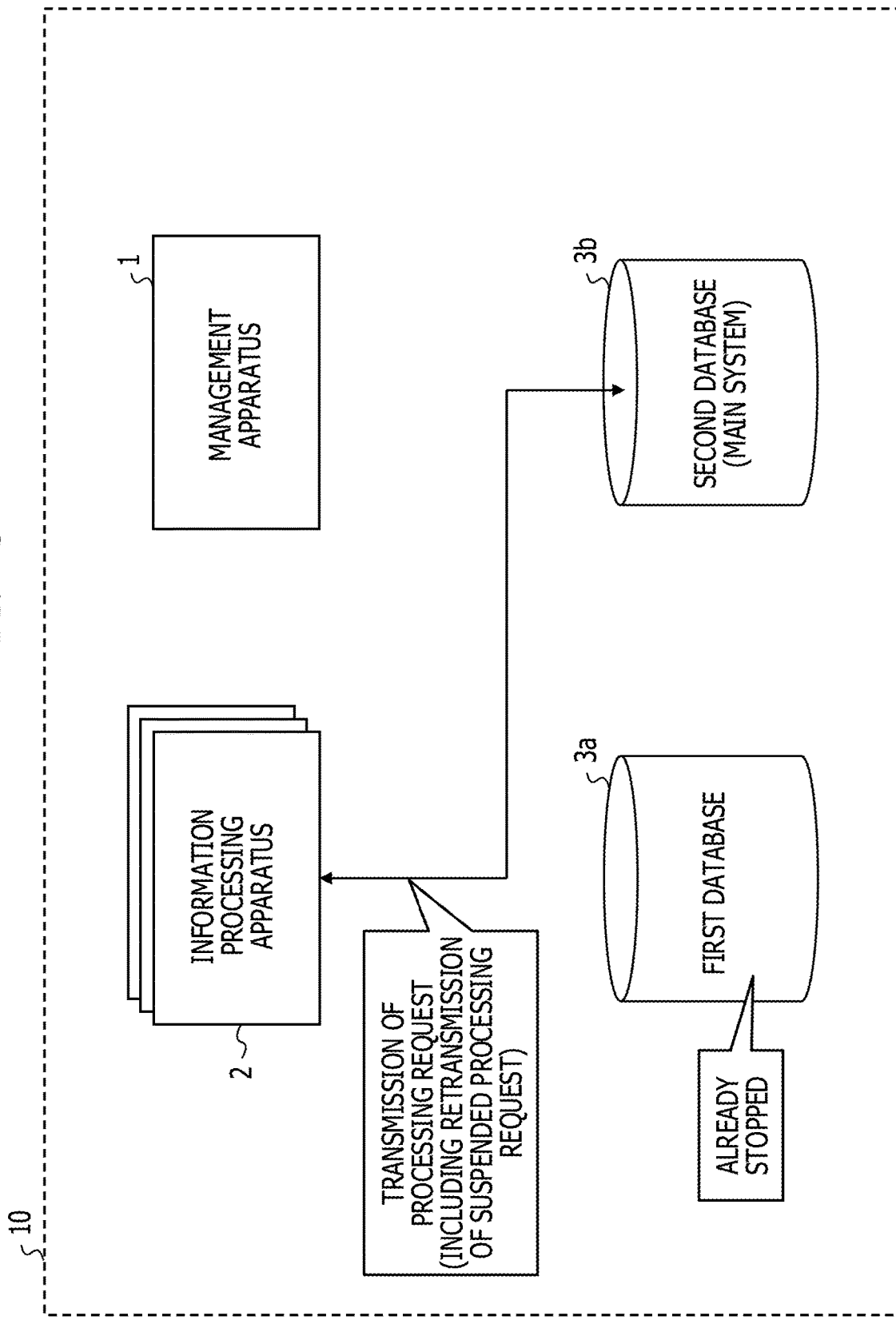
FIG. 3 is a diagram illustrating the configuration of the information processing system.

First, the configuration of an information processing system 10 is explained. FIGS. 1 to 3 are diagrams illustrating the configuration of the information processing system 10. The information processing system 10 illustrated in FIGS. 1 to 3 includes, for example, a management apparatus 1, an information processing apparatus 2, a first database 3a, and a second database 3b.

Note that, in the following explanation, the information processing system 10 includes the first database 3a and the second database 3b. However, the information processing system 10 may include three or more databases. In this case, the information processing system 10 may cause one of the three or more databases to function as a main system database and cause the databases other than the main system database to function as sub-system database.

In the example illustrated in FIG. 1, the information processing apparatus 2 is configured by one or more physical machines. An application for a provider to provide a service to users operates. For example, as illustrated in FIG. 1, when providing the service to the users, the information processing apparatus 2 transmits a processing request to the main system database (in the example illustrated in FIG. 1, the first database 3a) of the first database 3a and the second database 3b. Specifically, the processing request transmitted by the information processing apparatus 2 is, for example, a write request or a read request for data stored in the first database 3a.

On the other hand, when receiving the processing request transmitted by the information processing apparatus 2, as illustrated in FIG. 1, the first database 3a performs processing corresponding to the received processing request. In this case, as illustrated in FIG. 1, the first database 3a transmits data (differential data) updated by performing the processing corresponding to the processing request to the second database 3b to thereby perform synchronous processing between the data stored in the first database 3a and data stored in the second database 3b (the sub-system database).

The management apparatus 1 performs management of the first database 3a and the second database 3b. Specifically, as illustrated in FIG. 1, for example, the management apparatus 1 periodically transmits PING to the first database 3a (the main system database) to thereby perform monitoring of a processing state (existence monitoring) of the first database 3a.

As illustrated in FIG. 2, when detecting that a processing delay occurs in the first database 3a, for example, the management apparatus 1 issues an interrupt instruction to hardware of the first database 3a to thereby suspend the processing being executed in the first database 3a. In this case, as illustrated in FIG. 2, the management apparatus 1 issues an interrupt instruction to the hardware of the first database 3a to thereby stop the first database 3a.

Consequently, as illustrated in FIG. 3, after detecting the processing delay that occurs in the first database 3a, the management apparatus 1 is capable of causing the second database 3b to perform the processing corresponding to the processing request transmitted from the information processing apparatus 2 (including the processing corresponding to the processing request suspended in FIG. 2). Therefore, the management apparatus 1 is capable of stopping occurrence of data destruction involved in resumption of the processing (resumption of the processing unintended by the provider) in the first database 3a. Therefore, even when a processing delay occurs in the first database 3a (the main system database), the management apparatus 1 is capable of causing the first database 3a to continue the provision of the service to the users.

However, for example, when the hardware configuring the first database 3a is not adapted to the interrupt instruction issued by the management apparatus 1, the management apparatus 1 may not be able to stop the first database 3a in which the processing delay occurs because of the interrupt instruction to the hardware. Therefore, in the information processing system 10, even when the occurrence of the processing delay in the first database 3a is detected, the management apparatus 1 has to start the processing by the second database 3b without stopping the first database 3a. Therefore, in the information processing system 10, when the first database 3a resumes the processing (resumes the processing unintended by the provider) after the start of the processing by the second database 3b, data destruction is likely to occur because of, for example, the execution of the synchronous processing by the first database 3a.

Therefore, the management apparatus 1 in this embodiment stops, according to the detection of the processing delay of the first database 3a (the main system database), the synchronous processing between the first database 3a and the second database 3b (the sub-system database). The management apparatus 1 issues (transmits) an error notification concerning the processing being executed in the first database 3a. Further, when receiving a new processing request, the management apparatus 1 allocates the received new processing request to the second database 3b.

That is, when the processing delay occurs in the first database 3a, the management apparatus 1 stops the synchronous processing between the first database 3a and the second database 3b to stop the synchronous processing from being performed after the second database 3b starts the processing. Consequently, even when the first database 3a resumes the processing after the start of the processing by the second database 3b, the management apparatus 1 is capable of stopping the synchronous processing from being performed by the first database 3a between the first database 3a and the second database 3b. The management apparatus 1 is capable of stopping occurrence of data destruction.

The management apparatus 1 issues the error notification concerning the processing being executed in the first database 3a to the information processing apparatus 2 to cause the information processing apparatus 2 to perform suspension of the processing (uncompleted processing) executed by the first database 3a at the time of the occurrence of the processing delay and retransmission of the processing request corresponding to the processing. Consequently, the management apparatus 1 is capable of causing the second database 3b to perform not only processing corresponding to the new processing request transmitted from the information processing apparatus 2 after the occurrence of the processing delay in the first database 3a but also the processing being executed when the occurrence of the processing delay in the first database 3a is detected. The management apparatus 1 is capable of stopping occurrence of data destruction.

Further, the management apparatus 1 is located between the information processing apparatus 2 and the databases and receives the processing request transmitted by the information processing apparatus 2 to transmit the processing request received from the information processing apparatus 2 after the occurrence of the processing delay in the first database 3a (including the retransmission of the processing request corresponding to the suspended processing) to the second database 3b (the sub-system database). Consequently, even when the first database 3a resumes the processing, the management apparatus 1 is capable of stopping a situation in which a new processing request transmitted from the information processing apparatus 2 is transmitted to the first database 3a and processing corresponding to the new processing request is performed by the first database 3a. The management apparatus 1 is capable of stopping occurrence of data destruction.

Therefore, even when the processing delay occurs in the first database 3a, the management apparatus 1 is capable of continuing the provision of the service to the users without issuing an interrupt instruction to the hardware.

[Hardware Configuration of Information Processing System]

Figure 4:
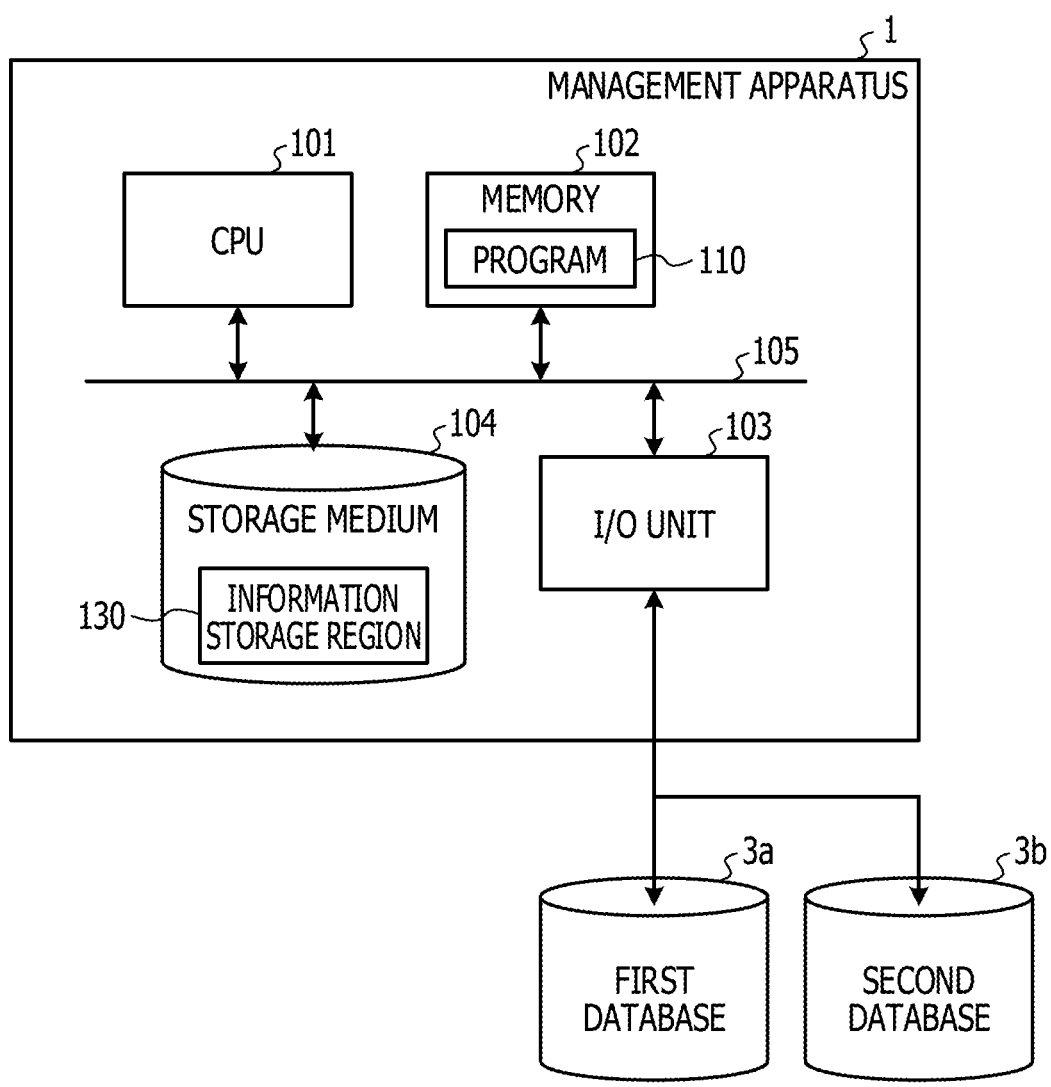
FIG. 4 is a diagram illustrating a hardware configuration of a management apparatus.

A hardware configuration of the information processing system 10 is explained. FIG. 4 is a diagram illustrating the hardware configuration of the management apparatus 1.

The management apparatus 1 includes a CPU 101, which is a processor, a memory 102, an external interface (an I/O unit) 103, and a storage medium 104. The units are connected to one another via a bus 105.

The storage medium 104 stores, in a program storage region (not illustrated in FIG. 4) in the storage medium 104, a computer program 110 for performing processing for performing management of the first database 3a and the second database 3b (hereinafter referred to as DB management processing as well). The storage medium 104 includes, for example, an information storage region 130 (hereinafter referred to as storing unit 130 as well) that stores information used in performing the DB management processing.

During execution of the computer program 110, the CPU 101 loads the computer program 110 from the storage medium 104 to the memory 102 and performs the DB management processing in cooperation with the computer program 110. For example, the external interface 103 performs communication with the first database 3a and the second database 3b.

[Functions of Information Processing System]

Figure 5:
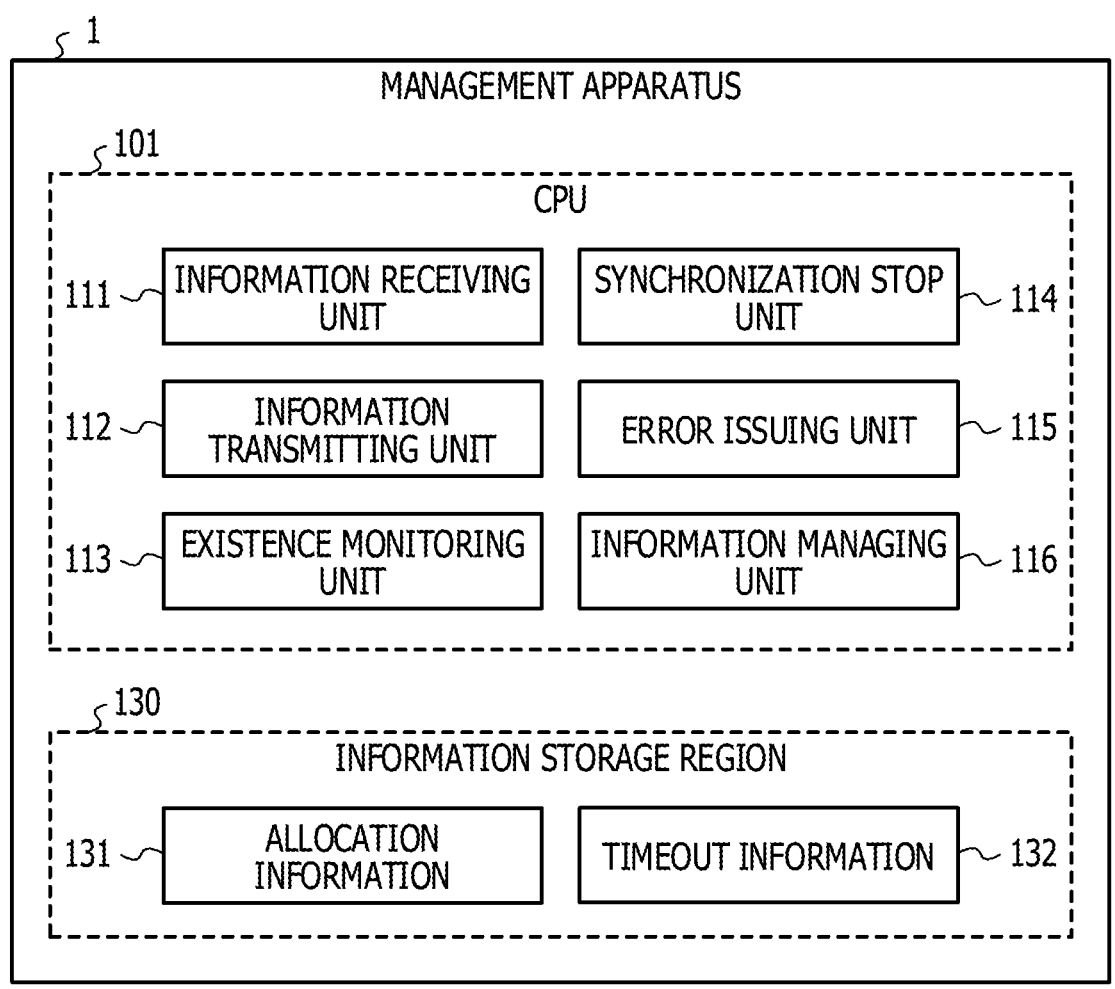
FIG. 5 is a functional block diagram of the management apparatus.

Functions of the information processing system 10 are explained. FIG. 5 is a functional block diagram of the management apparatus 1.

The CPU 101 of the management apparatus 1 cooperates with the computer program 110 to thereby operate as, for example, an information receiving unit 111, an information transmitting unit 112, an existence monitoring unit 113, a synchronization stop unit 114, and error issuing unit 115, and an information managing unit 116. In the information storage region 130, for example, allocation information 131 and timeout information 132 (hereinafter referred to as processing-related parameters as well) are stored.

The information receiving unit 111 receives a processing request to the first database 3a or the second database 3b transmitted from the information processing apparatus 2.

The information transmitting unit 112 transmits the processing request received by the information receiving unit 111 to either one of the first database 3a or the second database 3b. Specifically, the information transmitting unit 112 refers to the allocation information 131 stored in the information storage region 130 and transmits the processing request to a database indicated by the allocation information 131 of the first database 3a and the second database 3b. The allocation information 131 is information indicating a transmission destination of the processing request received by the information receiving unit 111.

The existence monitoring unit 113 performs existence monitoring of the first database 3a or the second database 3b (the first database 3a and the second database 3b). Specifically, for example, the existence monitoring unit 113 periodically transmits PING to the databases and determines that a database responding to the PING is operating (existing). On the other hand, for example, when a database not responding within a time indicated by the timeout information 132 is present, the existence monitoring unit 113 determines that the existing database is not operating (existing). Note that the timeout information 132 may be stored in the information storage region 130 in advance by the provider.

The synchronization stop unit 114 stops the synchronous processing between the first database 3a and the second database 3b according to the detection of the processing delay of the first database 3a (the main system database). Specifically, for example, the synchronization stop unit 114 updates an internet protocol (IP) table included in the second database 3b and shuts off a port in the second database 3b directed to the first database 3a to thereby stop the synchronous processing between the first database 3a and the second database 3b.

The error issuing unit 115 issues an error notification concerning processing being executed in the first database 3a (the main system database) to the information processing apparatus 2.

The information managing unit 116 updates the allocation information 131 stored in the information storage region 130. A specific example of the allocation information 131 is explained below.

[Outline of First Embodiment]

Figure 6:
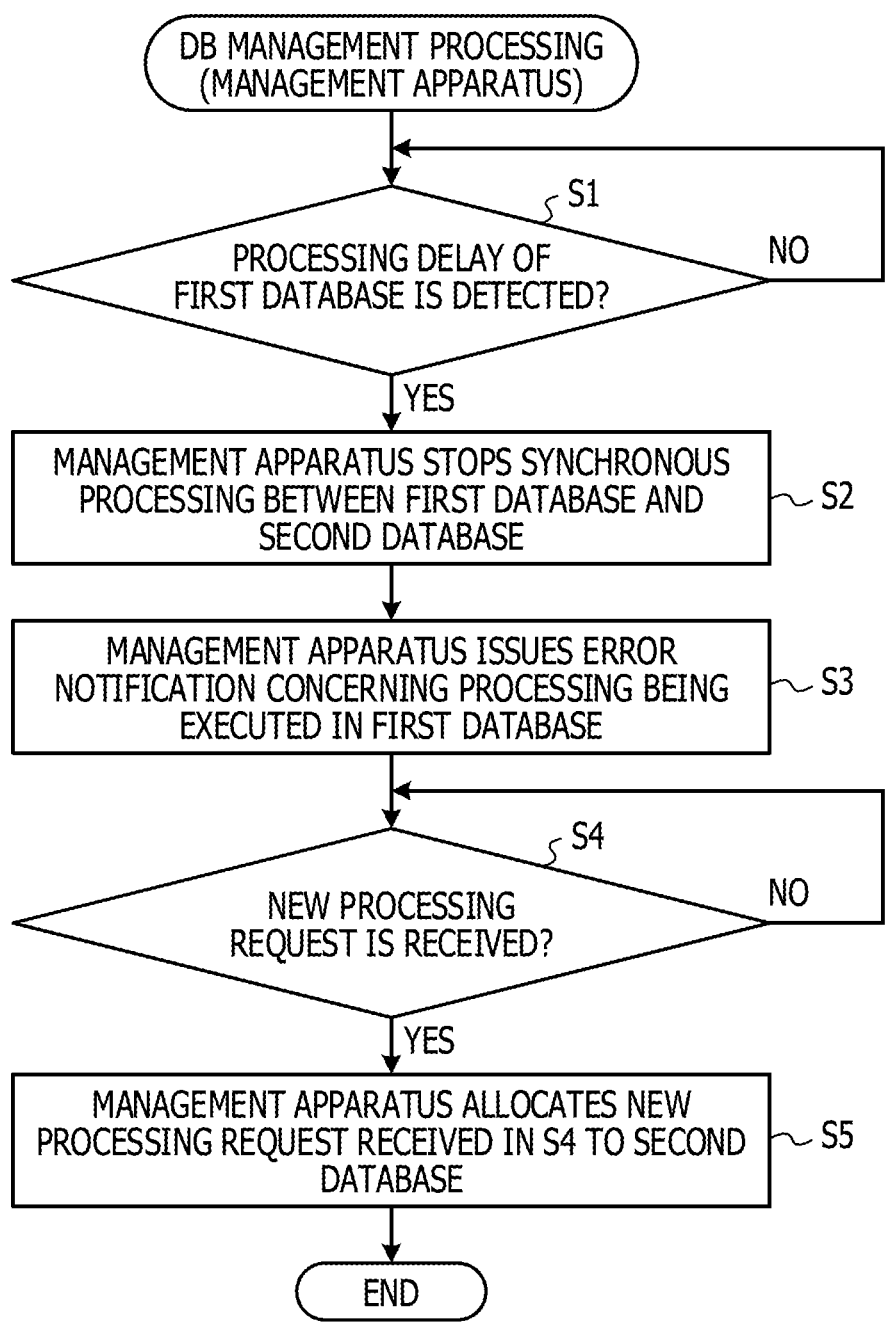
FIG. 6 is a flowchart for explaining an outline of DB management processing in a first embodiment.

An outline of a first embodiment is explained. FIG. 6 is a flowchart for explaining an outline of DB management processing in the first embodiment. FIGS. 7 to 12 are diagrams for explaining the outline of the DB management processing in the first embodiment.

Figure 7:
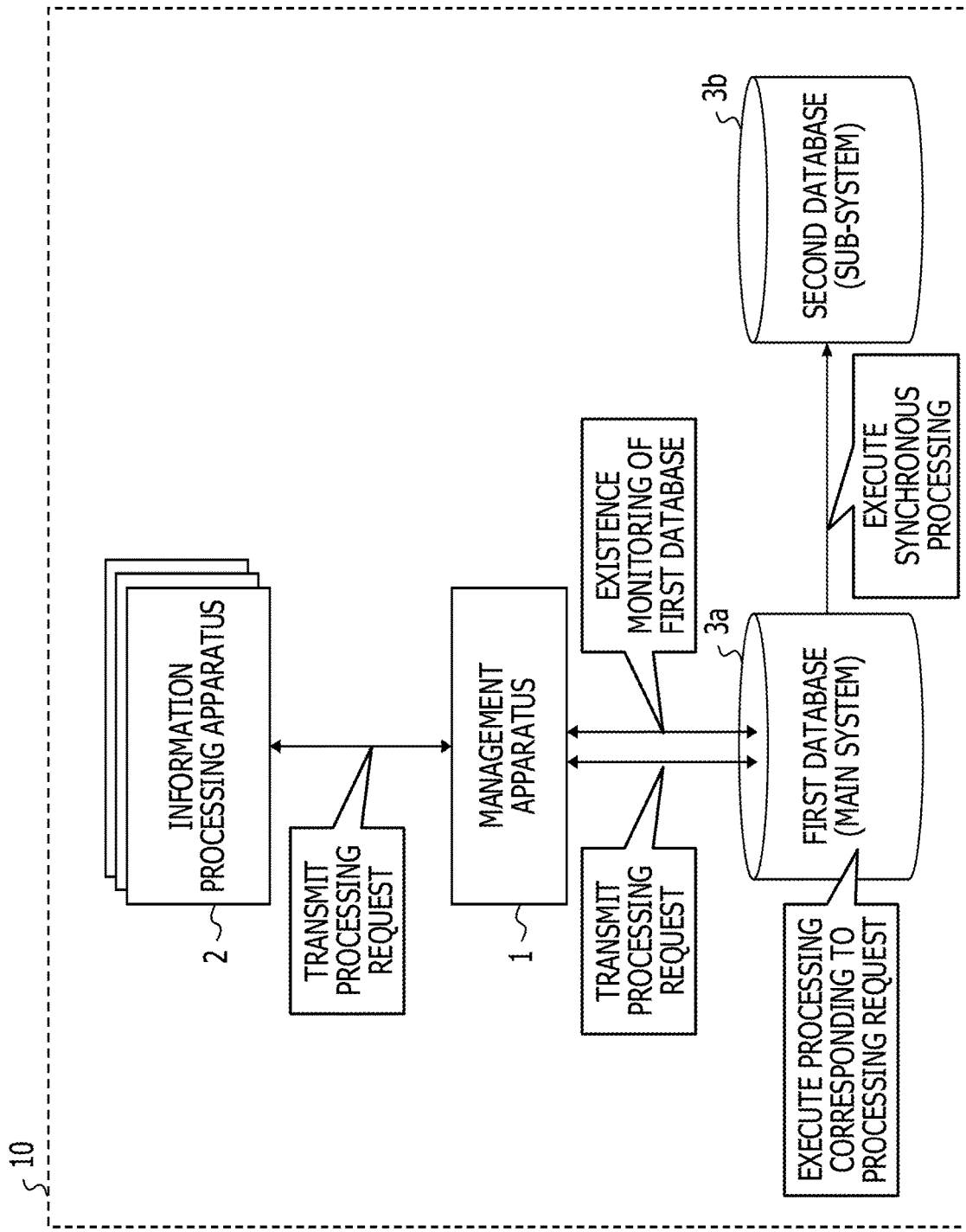
FIG. 7 is a diagram for explaining the outline of the DB management processing in the first embodiment.

As illustrated in FIG. 7, when the information processing apparatus 2 transmits a processing request to the first database 3a (the main system database), the management apparatus 1 temporarily receives the processing request transmitted from the information processing apparatus 2 and transmits the processing request to a present main system database (in an example illustrated in FIG. 7, the first database 3a). Thereafter, when receiving, from the first database 3a, a notification to the effect that processing corresponding to the processing request and the synchronous processing between the first database 3a and the second database 3b are completed (hereinafter referred to as completion notification as well), the management apparatus 1 transmits the received completion notification to the information processing apparatus 2.

As explained with reference to FIG. 1 and the like, as illustrated in FIG. 7, the management apparatus 1 performs existence monitoring of the first database 3a (the main system database).

Figure 8:
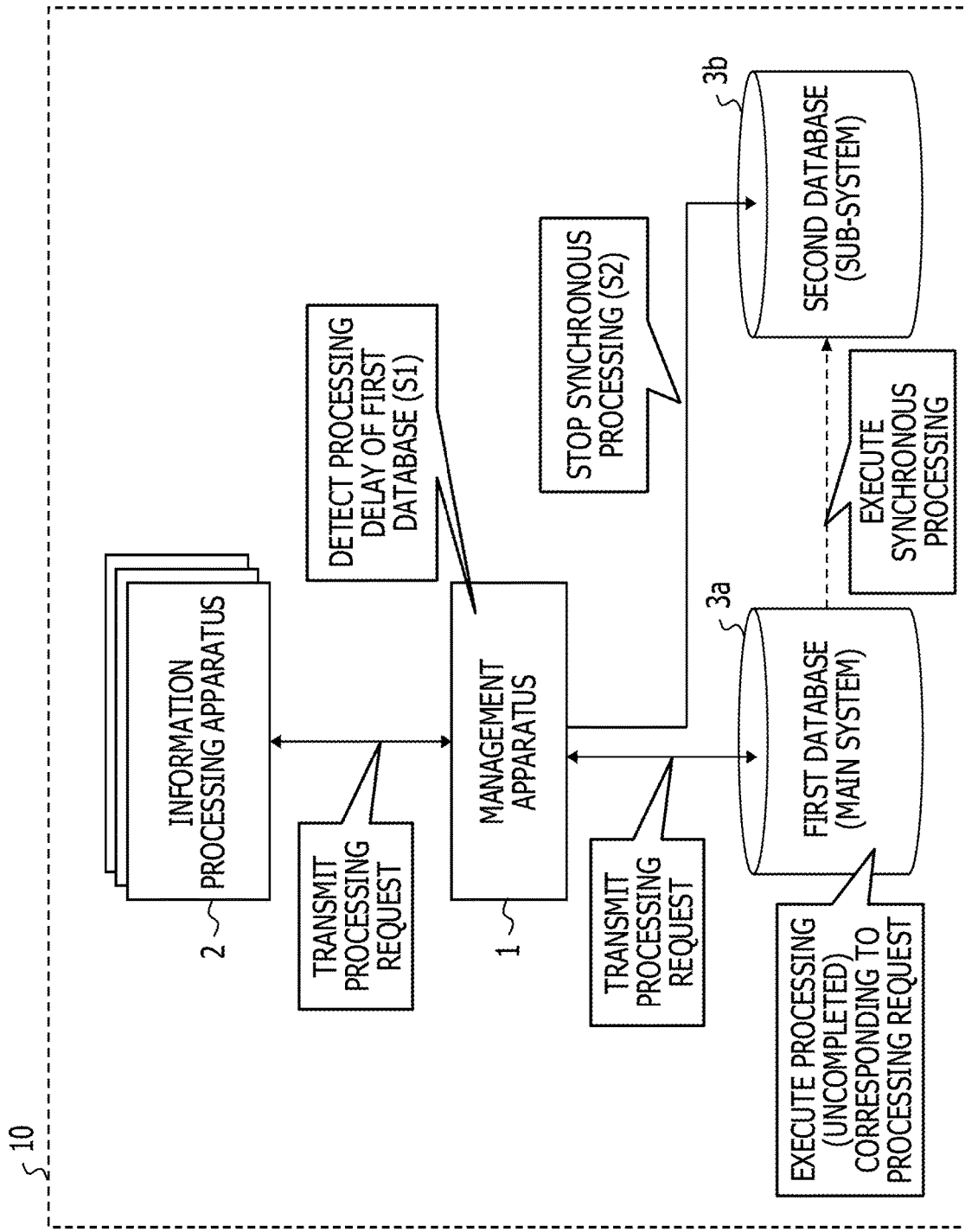
FIG. 8 is a diagram for explaining the outline of the DB management processing in the first embodiment.

On the other hand, as illustrated in FIG. 6, the management apparatus 1 stays on standby until the management apparatus 1 detects a processing delay in the first database 3a (NO in S1). When detecting a processing delay in the first database 3a (YES in S1), as illustrated in FIG. 8, the management apparatus 1 stops the synchronous processing between the first database 3a and the second database 3b (S2).

That is, when the processing delay occurs in the first database 3a, the management apparatus 1 stops the synchronous processing between the first database 3a and the second database 3b to stop the synchronous processing from being performed after the second database 3b starts processing. Consequently, even when the first database 3a resumes the processing after the start of the processing by the second database 3b, the management apparatus 1 is capable of stopping the synchronous processing from being performed between the first database 3a and the second database 3b by the first database 3a. The management apparatus 1 is capable of stopping occurrence of data destruction.

Figure 9:
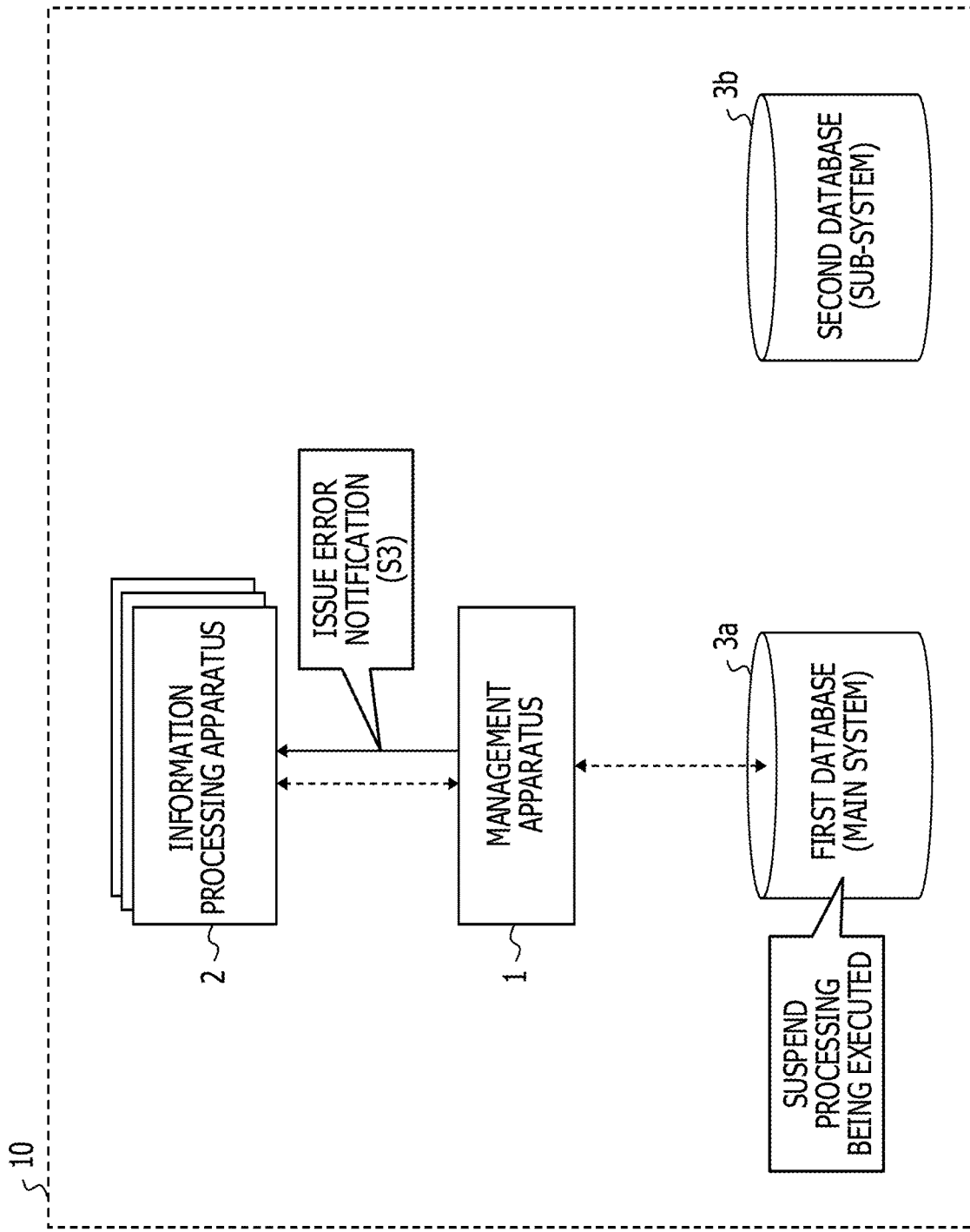
FIG. 9 is a diagram for explaining the outline of the DB management processing in the first embodiment.

Subsequently, as illustrated in FIG. 9, the management apparatus 1 issues an error notification concerning processing being executed in the first database 3a (S3). Specifically, the management apparatus 1 issues the error notification to the information processing apparatus 2 that transmits a processing request corresponding to the processing being executed in the first database 3a.

That is, the management apparatus 1 issues the error notification concerning the processing being executed in the first database 3a to the information processing apparatus 2 to cause the information processing apparatus 2 to perform suspension of the processing (uncompleted processing) executed by the first database 3a at the time of the occurrence of the processing delay and retransmission of the processing request corresponding to the processing. Consequently, the management apparatus 1 is capable of causing the second database 3b to perform not only processing corresponding to a new processing request transmitted from the information processing apparatus 2 after the occurrence of the processing delay in the first database 3a but also the processing being executed when the occurrence of the processing delay in the first database 3a is detected. The management apparatus 1 is capable of stopping occurrence of data destruction.

Figure 10:
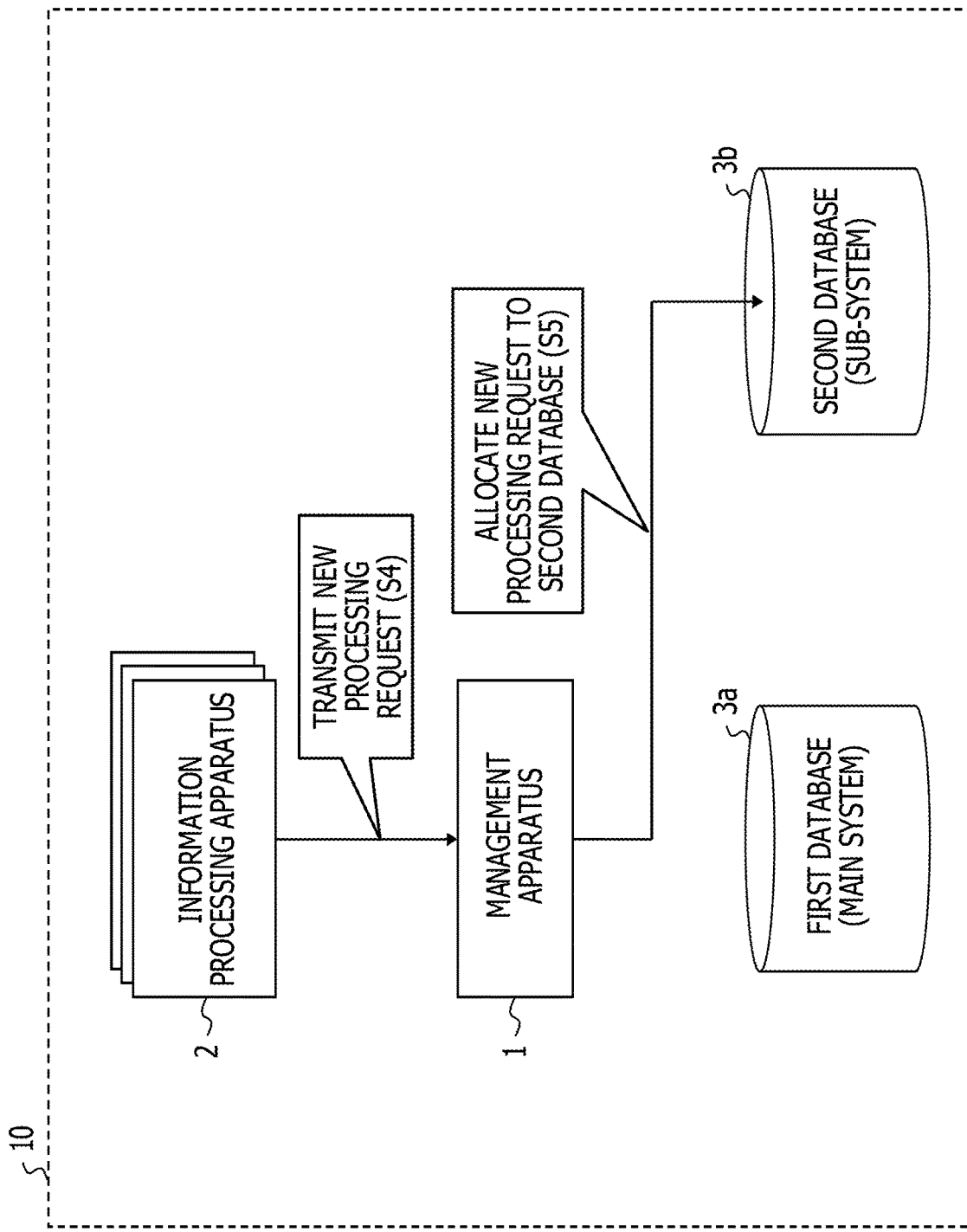
FIG. 10 is a diagram for explaining the outline of the DB management processing in the first embodiment.

Thereafter, the management apparatus 1 stays on standby until the management apparatus 1 receives a new processing request transmitted by the information processing apparatus 2 (NO in S4). Specifically, the management apparatus 1 stays on standby until the management apparatus 1 receives a normal processing request or a processing request (retransmission of a processing request) corresponding to the error notification issued to the information processing apparatus 2 in the processing in S3. When receiving a new processing request (YES in S4), as illustrated in FIG. 10, the management apparatus 1 allocates the new processing request received in the processing in S4 to the second database 3b (S5).

That is, the management apparatus 1 is located between the information processing apparatus 2 and the databases and receives the processing request transmitted by the information processing apparatus 2 to transmit a processing request received from the information processing apparatus 2 after the occurrence of the processing delay in the first database 3a (including the retransmission of the processing request corresponding to the suspended processing) to the second database 3b (the sub-system database). Consequently, even when the first database 3a resumes the processing, the management apparatus 1 is capable of stopping a situation in which a new processing request transmitted from the information processing apparatus 2 is transmitted to the first database 3a and processing corresponding to the new processing request is performed by the first database 3a. The management apparatus 1 is capable of stopping occurrence of data destruction.

Consequently, even when a processing delay occurs in the first database 3a, the management apparatus 1 is capable of continuing the provision of the service to the users without issuing an interrupt instruction to the hardware.

Note that the management apparatus 1, the information processing apparatus 2, the first database 3a, and the second database 3b may be respectively configured by physical machines or may be configured by virtual machines generated on the physical machines.

Figure 11:
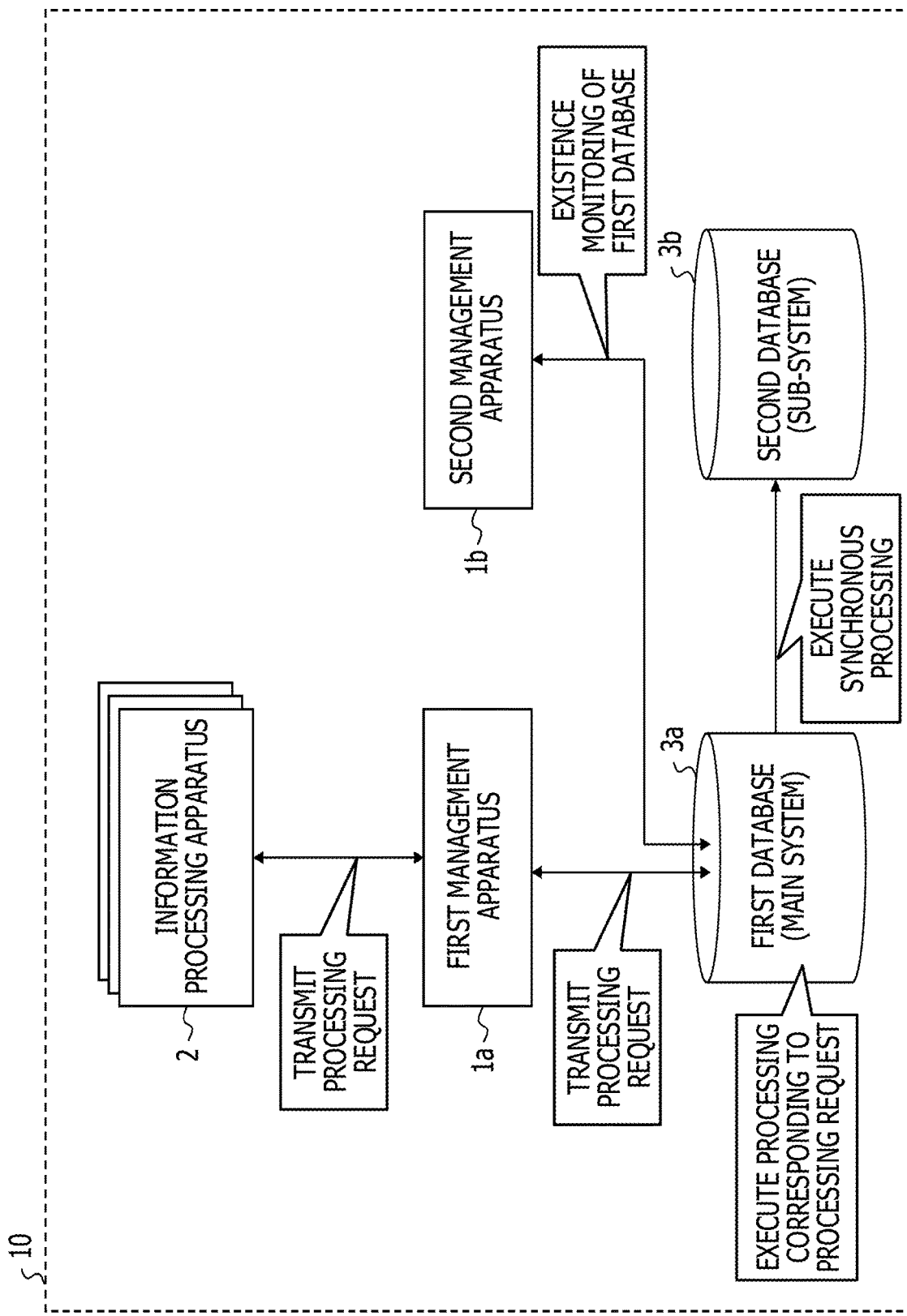
FIG. 11 is a diagram for explaining the outline of the DB management processing in the first embodiment.
Figure 12:
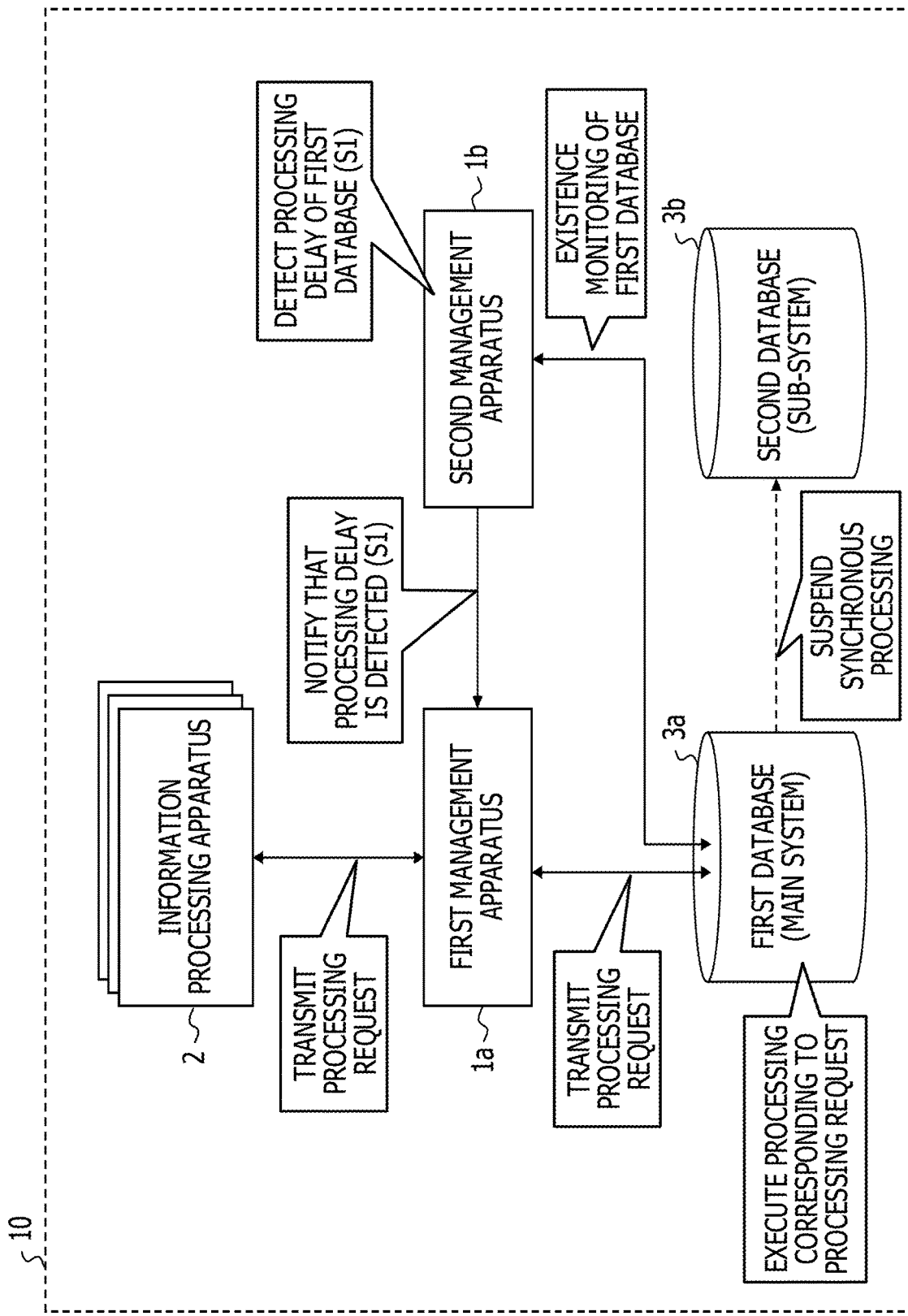
FIG. 12 is a diagram for explaining the outline of the DB management processing in the first embodiment.

As illustrated in FIGS. 11 and 12, the information processing system 10 may include a first management apparatus 1a and a second management apparatus 1b instead of the management apparatus 1 explained with reference to FIG. 7 and the like. As illustrated in FIG. 11, the first management apparatus 1a performs, for example, transmission and reception of the processing request received from the information processing apparatus 2 and the completion notification received from the first database 3a and the like in the processing performed by the management apparatus 1 explained with reference to FIG. 7 and the like. As illustrated in FIG. 11, the second management apparatus 1b performs, for example, the existence monitoring of the first database 3a and the like in the processing performed by the management apparatus 1 explained with reference to FIG. 7 and the like.

As illustrated in FIG. 12, for example, when detecting occurrence of a processing delay in the first database 3a, the second management apparatus 1b may transmit a notification indicating the occurrence of the processing delay in the first database 3a to the first management apparatus 1a. Thereafter, the first management apparatus 1a may start the processing in S2 and subsequent steps explained with reference to FIG. 6 according to the reception of the notification from the first management apparatus 1a (YES in S1).

[Details of First Embodiment]

Details of the first embodiment are explained. FIGS. 13 to 16 are flowcharts for explaining details of the DB management processing in the first embodiment. FIGS. 17 and 18 are diagrams for explaining the details of the DB management processing in the first embodiment. The details of the DB management processing illustrated in FIGS. 17 and 18 are explained with reference to FIGS. 13 to 16.

[Information Allocation Processing]

First, processing for performing allocation of a processing request received from the information processing apparatus 2 (hereinafter referred to as information allocation processing as well) is explained.

Figure 13:
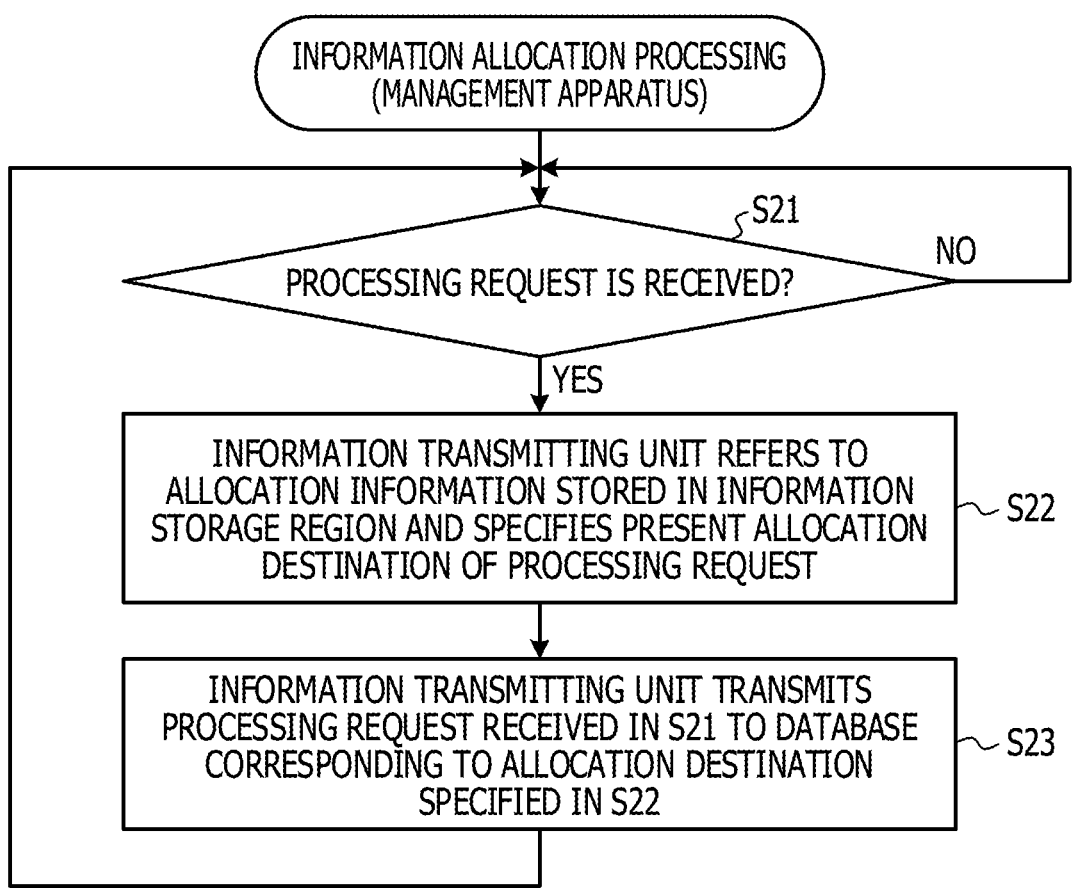
FIG. 13 is a flowchart for explaining details of the DB management processing in the first embodiment.

As illustrated in FIG. 13, the information receiving unit 111 of the management apparatus 1 stays on standby until the information receiving unit 111 receives a processing request transmitted from the information processing apparatus 2 (NO in S21). When a processing request is received (YES in S21), the information transmitting unit 112 of the management apparatus 1 refers to the allocation information 131 stored in the information storage region 130 and specifies a present allocation destination of the processing request received from the information processing apparatus 2 (S22). A specific example of the allocation information 131 is explained below.

[Specific Example of Allocation Information]

FIGS. 17 and 18 are diagrams for explaining the specific example of the allocation information 131. The allocation information 131 illustrated in FIGS. 17 and 18 includes, as items, an "item number" for identifying respective kinds of information included in the allocation information 131, a "main system DB" in which an IP address of the main system database is set, and a "sub-system DB" in which an IP address of the sub-system database is set.

Specifically, in the allocation information 131 illustrated in FIG. 17, "10.2.AA.BB" is set as a "main system DB" of information, the "item number" of which is "1" and "10.2.AA.CC" is set as a "sub-system DB" of the information.

In processing in S22, for example, the information transmitting unit 112 refers to the allocation information 131 illustrated in FIG. 17 and specifies, as a present allocation destination of the processing request received from the information processing apparatus 2, "10.2.AA.BB" set as the "main system DB".

Referring back to FIG. 13, the information transmitting unit 112 transmits the processing request received in the processing in S21 to the allocation destination specified in the processing in S22 (S23). Specifically, when the allocation destination specified in the processing in S22 is "10.2.AA.BB", the information transmitting unit 112 transmits the processing request received in the processing in S21 to the database, the IP address of which is "10.2.AA.BB".

Figure 14:
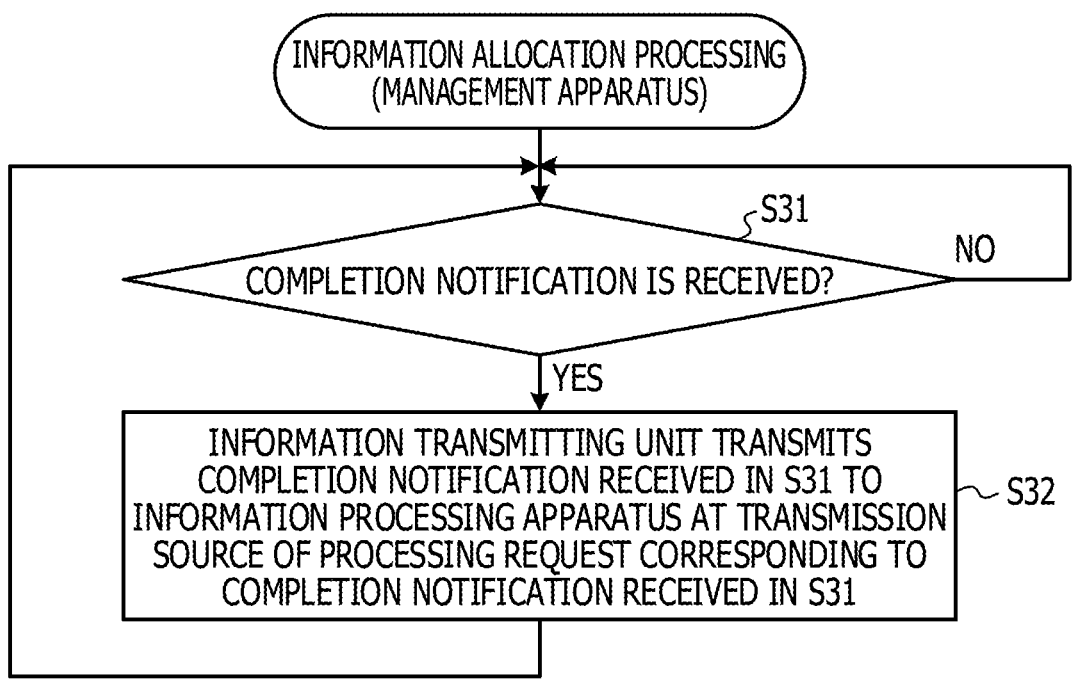
FIG. 14 is a flowchart for explaining the details of the DB management processing in the first embodiment.

As illustrated in FIG. 14, the information receiving unit 111 stays on standby until the information receiving unit 111 receives a completion notification of processing corresponding to the processing request from the first database 3a or the second database 3b (NO in S31). Specifically, the information receiving unit 111 stays on standby until the information receiving unit 111 receives a completion notification indicating that processing corresponding to the processing request transmitted in the processing in S23 and synchronous processing (synchronous processing of data stored in the first database 3a and data stored in the second database 3b) after the processing are completed. When the completion notification is received (YES in S31), the information transmitting unit 112 transmits the received completion notification to the information processing apparatus 2 (S32).

Consequently, the information processing apparatus 2 is capable of determining that the processing corresponding to the processing request transmitted to the first database 3a and the like is completed.

[Details of DB Management Processing]

Details of the DB management processing are explained. Note that, in the following explanation, it is assumed that the first database 3a is the main system database and the second database 3b is the sub-system database.

Figure 15:
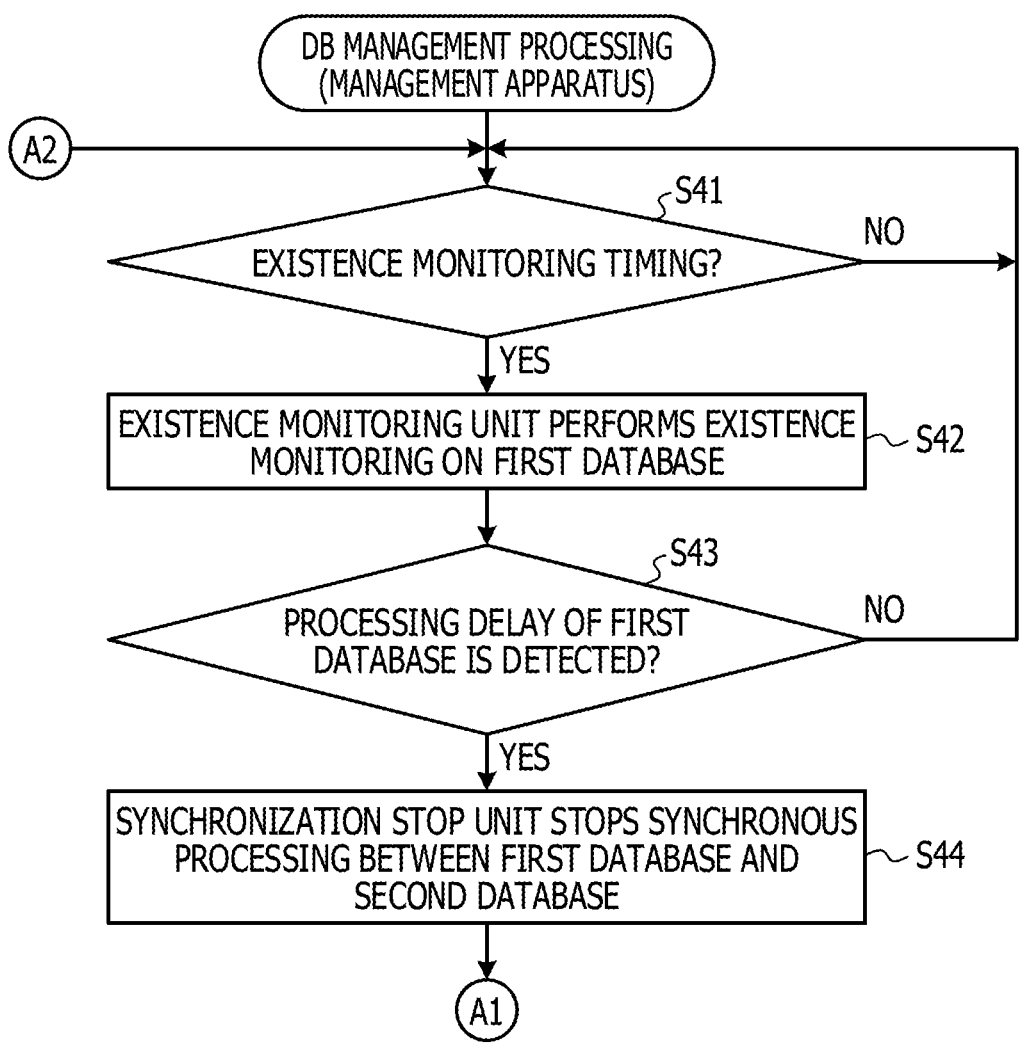
FIG. 15 is a flowchart for explaining the details of the DB management processing in the first embodiment.

As illustrated in FIG. 15, the existence monitoring unit 113 of the management apparatus 1 stays on standby until existence monitoring timing (NO in S41). The existence monitoring timing may be periodic timing such as every one minute.

When the existence monitoring timing comes (YES in S41), the existence monitoring unit 113 performs existence monitoring on the first database 3a (S42). Specifically, for example, the existence monitoring unit 113 transmits PING to the first database 3a.

Thereafter, the existence monitoring unit 113 stays on standby until the existence monitoring unit 113 detects a processing delay in the first database 3a. Specifically, for example, when a response is not received from the first database 3a within a time indicated by the timeout information 132 stored in the information storage region 130 although the PING is transmitted to the first database 3a in the processing in S42, the existence monitoring unit 113 determines that a processing delay occurs in the first database 3a.

When a processing delay in the first database 3a is detected (YES in S43), the synchronization stop unit 114 of the management apparatus 1 stops the synchronous processing between the first database 3a and the second database 3b (S44). On the other hand, when a processing delay in the first database 3a is not detected (NO in S43), the existence monitoring unit 113 performs the processing in S41 and subsequent steps again.

Figure 16:
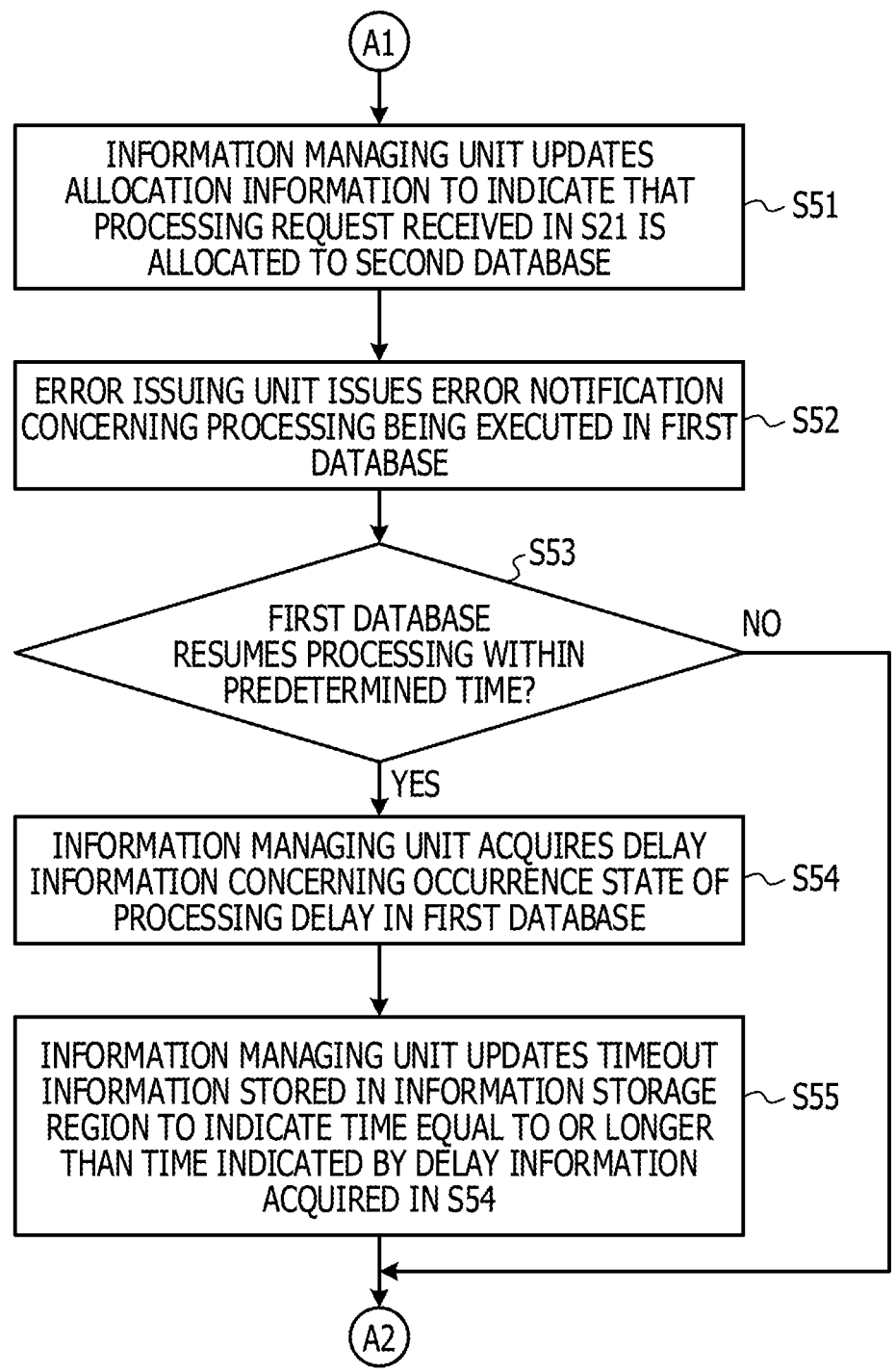
FIG. 16 is a flowchart for explaining the details of the DB management processing in the first embodiment.

Subsequently, as illustrated in FIG. 16, the information managing unit 116 of the management apparatus 1 updates the allocation information 131 to indicate that the processing request received in the processing in S21 is allocated to the second database 3b (S51). Specifically, as illustrated in FIG. 18, for example, the information managing unit 116 sets, in the "main system DB" of the information, the "item" of which is "1", "10.2.AA.CC." set in the "sub-system DB" in the allocation information 131 explained with reference to FIG. 17. As illustrated in FIG. 18, for example, the information managing unit 116 sets, in the "sub-system DB", "-" indicating that information is absent.

Consequently, when receiving the new processing request in the processing in S43, the management apparatus 1 is capable of causing the second database 3b to process the received new processing request.

The error issuing unit 115 of the management apparatus 1 issues an error notification concerning processing being executed in the first database 3a (S52). Specifically, for example, at a point in time when the processing in S52 is performed, the error issuing unit 115 determines that processing corresponding to a processing request for which a completion notification is not received from the first database 3a is processing currently executed by the first database 3a. That is, the processing currently executed by the first database 3a may include, for example, processing corresponding to a processing request transmitted from the information processing apparatus 2 to the first database 3a after the processing delay of the first database 3a is detected. The error issuing unit 115 issues, to the information processing apparatus 2, an error notification including information for specifying the processing determined as currently being executed in the first database 3a.

Thereafter, the information managing unit 116 determines whether the first database 3a resumes the processing within a predetermined time (S53). The predetermined time may be, for example, 10 minutes.

As a result, when determining that the first database 3a resumes the processing within the predetermined time (YES in S53), the information managing unit 116 acquires delay information concerning an occurrence state of the processing delay in the first database 3a (S54). The delay information is a delay time that actually occurs in the first database 3a and is information acquired from log information and the like in the first database 3a.

Subsequently, in this case, the information managing unit 116 updates the timeout information 132 stored in the information storage region 130 to indicate a time equal to or longer than a time indicated by the delay information acquired in the processing in S54 (S55).

Consequently, the information managing unit 116 is capable of stopping switching of the main system database from being performed every time a processing delay of the same degree as a processing delay in the past occurs in the first database 3a.

Note that the information managing unit 116 may transmit a request for monitoring to the first database 3a and acquire delay information transmitted from the first database 3a in response to the transmitted request for monitoring.

After the processing in S55 or when determining in the processing in S53 that the first database 3a does not resume the processing within the predetermined time (NO in S53), the existence monitoring unit 113 performs the processing in S41 and subsequent steps again.

In this way, the management apparatus 1 stops, according to the detection of the processing delay of the first database 3a (the main system database), the synchronous processing between the first database 3a and the second database 3b (the sub-system database). The management apparatus 1 issues an error notification concerning processing being executed in the first database 3a. Further, when receiving a new processing request, the management apparatus 1 allocates the received new processing request to the second database 3b.

That is, when a processing delay occurs in the first database 3a, the management apparatus 1 stops the synchronous processing between the first database 3a and the second database 3b to stop the synchronous processing from being performed after the second database 3b starts processing. Consequently, even when the first database 3a resumes the processing after the start of the processing by the second database 3b, the management apparatus 1 is capable of stopping the synchronous processing from being performed between the first database 3a and the second database 3b by the first database 3a. The management apparatus 1 is capable of stopping occurrence of data destruction.

The management apparatus 1 issues, to the information processing apparatus 2, an error notification concerning the processing being executed in the first database 3a to cause the information processing apparatus 2 to perform suspension of processing (uncompleted processing) executed by the first database 3a at the time of the occurrence of the processing delay and retransmission of a processing request corresponding to the processing. Consequently, the management apparatus 1 is capable of causing the second database 3b to perform not only processing corresponding to the new processing request transmitted from the information processing apparatus 2 after the occurrence of the processing delay in the first database 3a but also the processing being executed when the occurrence of the processing delay in the first database 3a is detected. The management apparatus 1 is capable of stopping occurrence of data destruction.

Further, the management apparatus 1 is located between the information processing apparatus 2 and the databases and receives the processing request transmitted by the information processing apparatus 2 to transmit the processing request received from the information processing apparatus 2 after the occurrence of the processing delay in the first database 3a (including the retransmission of the processing request corresponding to the suspended processing) to the second database 3b (the sub-system database). Consequently, even when the first database 3a resumes the processing, the management apparatus 1 is capable of stopping a situation in which a new processing request transmitted from the information processing apparatus 2 is transmitted to the first database 3a and processing corresponding to the new processing request is performed by the first database 3a. The management apparatus 1 is capable of stopping occurrence of data destruction.

Therefore, even when the processing delay occurs in the first database 3a, the management apparatus 1 is capable of continuing the provision of the service to the users without issuing an interrupt instruction to the hardware.

[Details of Second Embodiment]

Details of a second embodiment are explained. FIGS. 19 to 22 are flowcharts for explaining details of DB management processing in the second embodiment.

When detecting a processing delay of the first database 3a, the management apparatus 1 in the first embodiment updates the allocation information 131 after the stop of the synchronous processing and issues the error notification after the update of the allocation information 131. On the other hand, when detecting a processing delay of the first database 3a, the management apparatus 1 in the second embodiment issues an error notification after the stop of the synchronous processing and updates the allocation information 131 after issuing the error notification.

[Information Allocation Processing in Second Embodiment]

First, information allocation processing in the second embodiment is explained.

Figure 19:
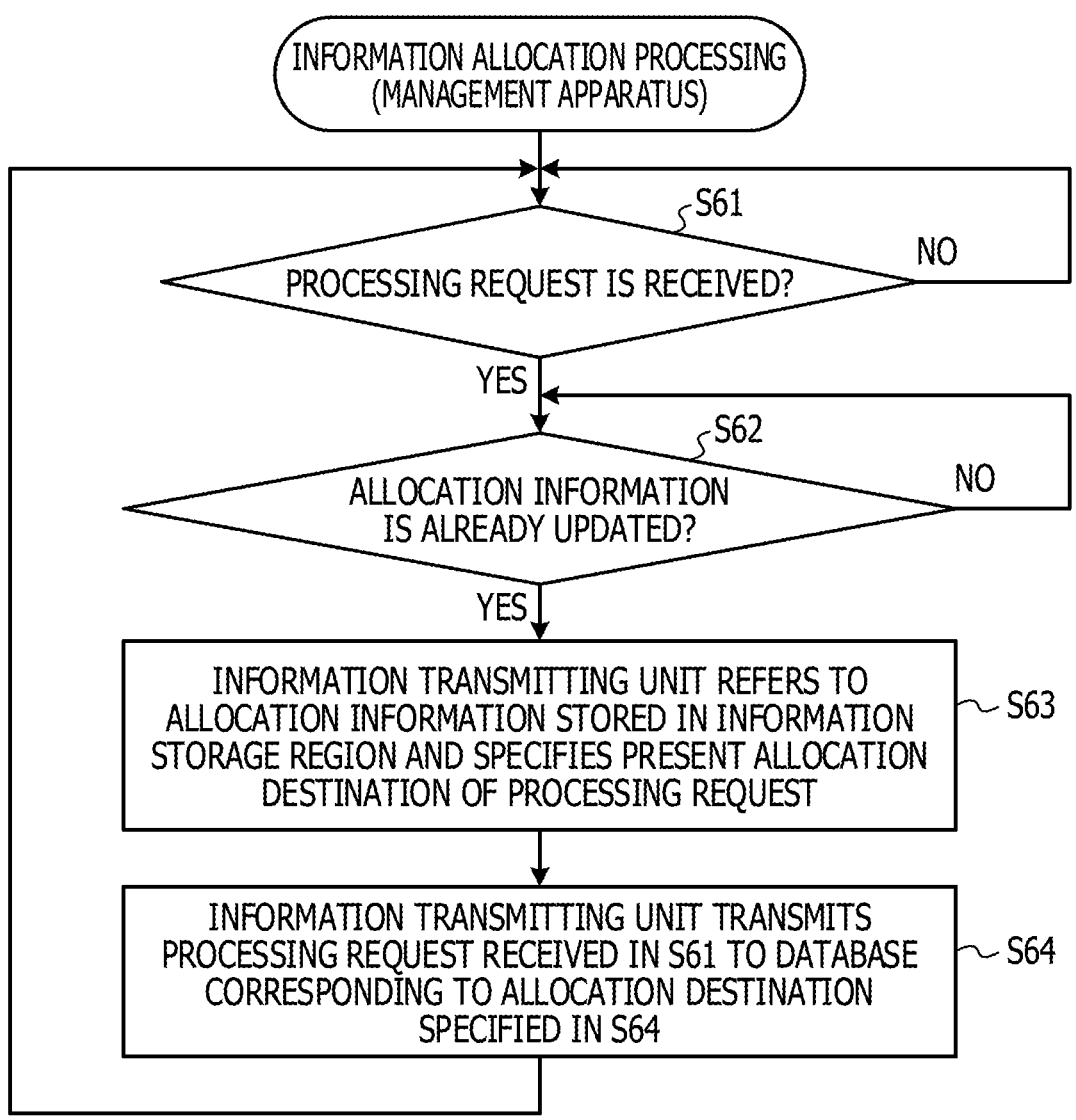
FIG. 19 is a flowchart for explaining details of DB management processing in a second embodiment.

As illustrated in FIG. 19, the information receiving unit 111 stays on standby until the information receiving unit 111 receives a processing request transmitted from the information processing apparatus 2 (NO in S61).

When a processing request is received (YES in S61), the information transmitting unit 112 determines whether the allocation information 131 is updated according to occurrence of a processing delay in the first database 3a (S62). Specifically, the information transmitting unit 112 determines whether the allocation information 131 is updated after transmission of an error notification involved in occurrence of a processing delay in the first database 3a is performed last time, for example.

As a result, when determining that the allocation information 131 is updated according to the occurrence of the processing delay in the first database 3a (YES in S62), the information transmitting unit 112 performs processing in S63 and subsequent steps. On the other hand, when determining that the allocation information 131 is not updated according to the occurrence of the processing delay in the first database 3a (NO in S62), the information transmitting unit 112 stays on standby until the allocation information 131 is updated. The information transmitting unit 112 performs the processing in S63 and subsequent steps after the allocation information 131 is updated.

That is, even when the update of the allocation information 131 is performed after the issuance of the error notification, the information transmitting unit 112 has to transmit, to the second database 3b, all processing requests (including a processing request for an error notification issued by the error issuing unit 115) transmitted from the information processing apparatus 2 after the occurrence of the processing delay in the first database 3a. Therefore, in the processing in S62, for example, the information transmitting unit 112 determines whether the allocation information 131 is updated after the error notification involved in the occurrence of the processing delay in the first database 3a is transmitted last time.

Consequently, even when the allocation information 131 is updated after the error notification is issued, the management apparatus 1 is capable of stopping occurrence of data destruction.

Note that the processing in S62 may be performed only before the allocation information 131 is updated after the error notification involved in the occurrence of the processing delay in the first database 3a is transmitted.

Thereafter, the information managing unit 116 refers to the allocation information 131 stored in the information storage region 130 and specifies a present allocation destination of the processing request received from the information processing apparatus 2 (S63). The information transmitting unit 112 transmits the processing request received in the processing in S61 to the allocation destination specified in the processing in S63 (S64).

Figure 20:
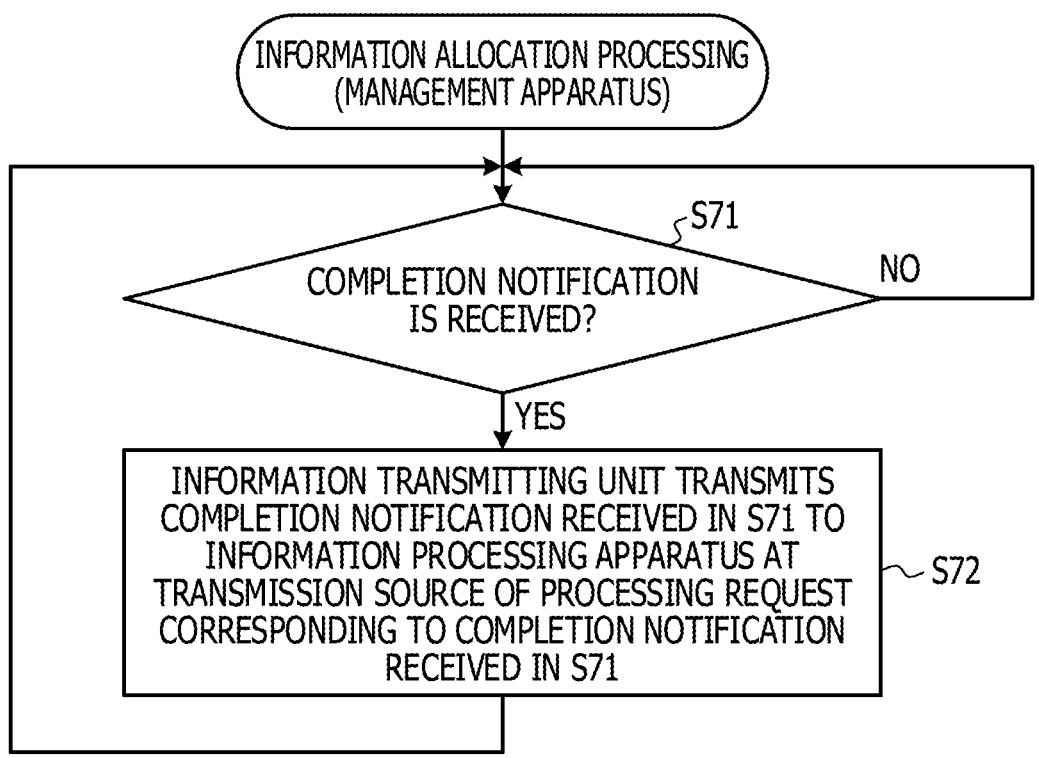
FIG. 20 is a flowchart for explaining the details of the DB management processing in the second embodiment.

As illustrated in FIG. 20, as in the first embodiment, the information receiving unit 111 stays on standby until the information receiving unit 111 receives a completion notification of processing corresponding to a processing request from the first database 3a or the second database 3b (NO in S71). Specifically, the information receiving unit 111 stays on standby until the information receiving unit 111 receives a completion notification indicating that processing corresponding to the processing request transmitted in the processing in S64 and synchronous processing (synchronous processing of data stored in the first database 3a and data stored in the second database 3b) after the processing are completed. When the completion notification is received (YES in S71), as in the first embodiment, the information transmitting unit 112 transmits the completion notification received in the processing in S71 to the information processing apparatus 2 (S72).

[DB Management Processing in Second Embodiment]

DB management processing in the second embodiment is explained. Note that, in the following explanation, it is assumed that the first database 3a is a main system database and the second database 3b is a sub-system database.

Figure 21:
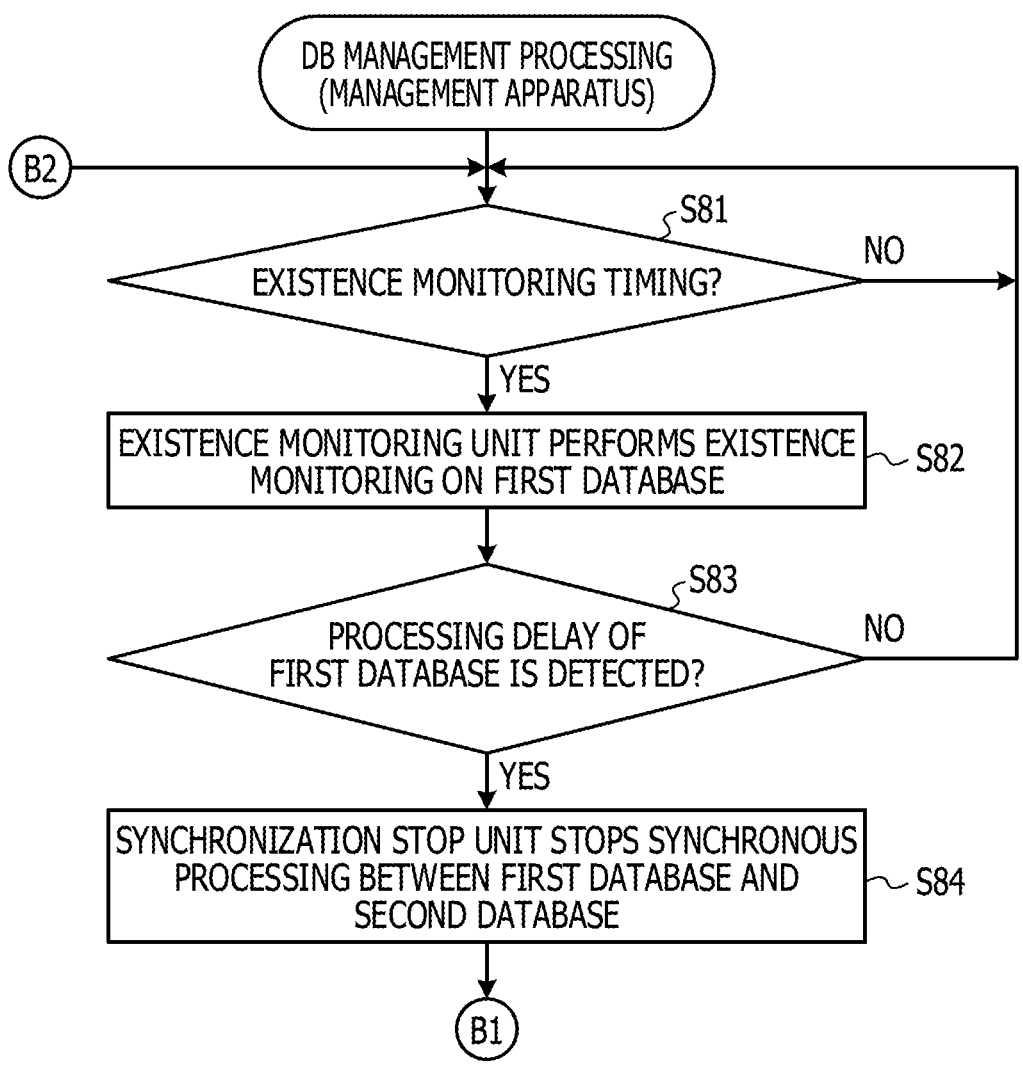
FIG. 21 is a flowchart for explaining the details of the DB management processing in the second embodiment.

As illustrated in FIG. 21, the existence monitoring unit 113 stays on standby until existence monitoring timing (NO in S81). When the existence monitoring timing comes (YES in S81), as in the first embodiment, the existence monitoring unit 113 performs the existence monitoring on the first database 3a (S82).

Thereafter, the synchronization stop unit 114 stays on standby until the synchronization stop unit 114 detects a processing delay in the first database 3a (NO in S83). When detecting a processing delay in the first database 3a (YES in S43), as in the first embodiment, the synchronization stop unit 114 stops the synchronous processing between the first database 3a and the second database 3b (S84).

Figure 22:
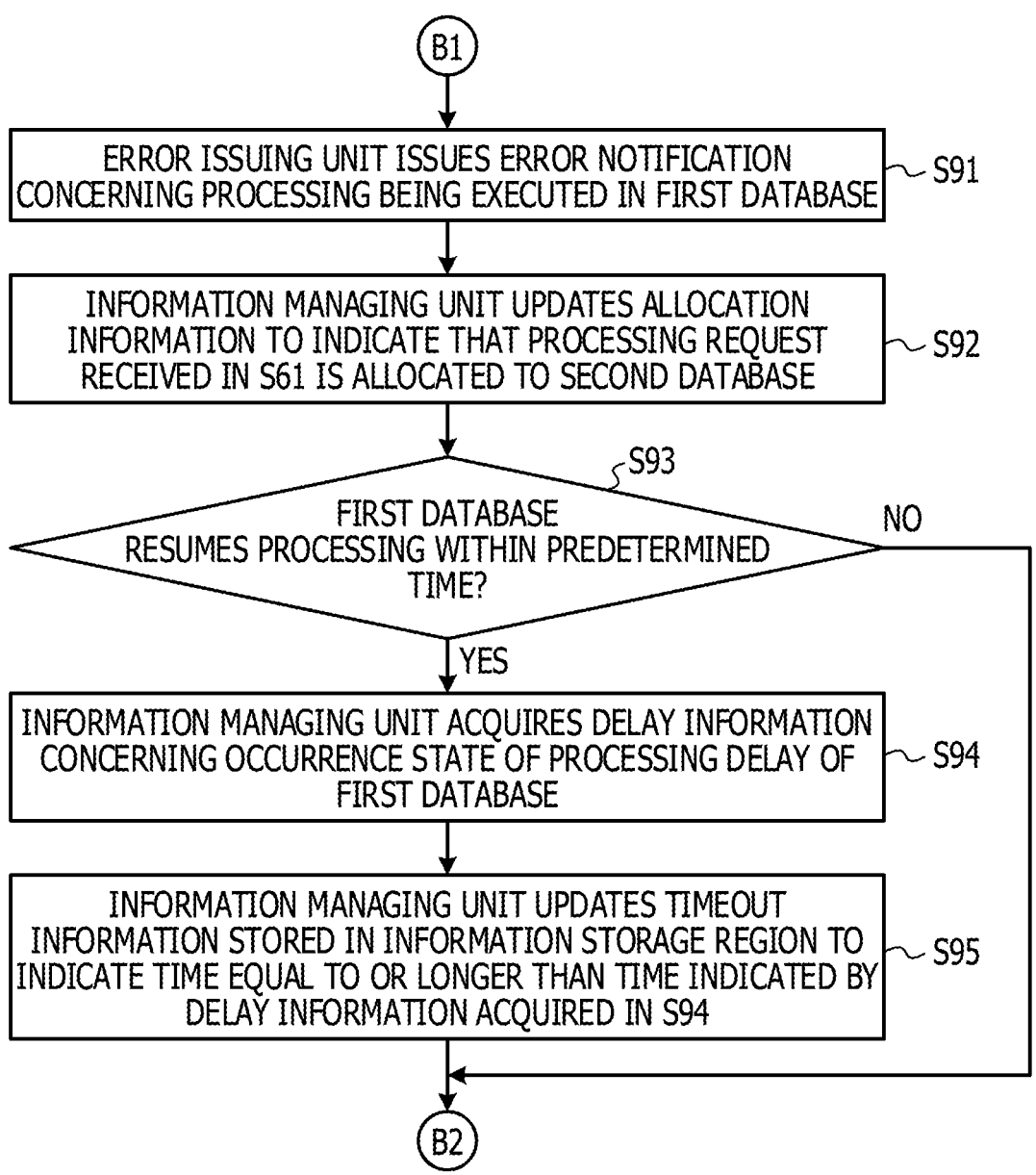
FIG. 22 is a flowchart for explaining the details of the DB management processing in the second embodiment.

Subsequently, as illustrated in FIG. 22, the error issuing unit 115 issues an error notification concerning processing being executed in the first database 3a (S91). Thereafter, the information managing unit 116 updates the allocation information 131 to indicate that the processing request received in the processing in S61 is allocated to the second database 3b (S92).

That is, the management apparatus 1 in the second embodiment issues an error notification to the information processing apparatus 2 without waiting for completion of the update of the allocation information 131. As explained with reference to FIG. 19, when a processing delay in the first database 3a occurs, the management apparatus 1 in the second embodiment does not allocate a processing request transmitted from the information processing apparatus 2 until the allocation information 131 is updated.

Consequently, the management apparatus 1 is capable of bringing forward issuance timing of the error notification to the information processing apparatus 2 while stopping occurrence of data destruction due to the issuance of the error notification before the update of the allocation information 131. Therefore, the management apparatus 1 is capable of further suppressing the influence on a service (a service provided to users by a provider) due to the processing delay that occurs in the first database 3a.

Thereafter, as in the first embodiment, the information managing unit 116 determines whether the first database 3a resumes the processing within the predetermined time (S93).

As a result, when determining that the first database 3a resumes the processing within the predetermined time (YES in S93), as in the first embodiment, the information managing unit 116 acquires delay information concerning an occurrence state of the processing delay in the first database 3a (S94).

Subsequently, in this case, as in the first embodiment, the information managing unit 116 updates the timeout information 132 stored in the information storage region 130 to indicate a time equal to or longer than a time indicated by the delay information acquired in the processing in S94 (S95).

After the processing in S95 or when it is determined in the processing in S93 that the first database 3a does not resume the processing within the predetermined time (NO in S93), as in the first embodiment, the existence monitoring unit 113 performs the processing in S81 and subsequent steps again.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A management apparatus configured to manage a first database and a second database synchronized with each other, the management apparatus comprising:
   a memory; and
   a processor coupled to the memory and the processor configured to:
   perform a stop of synchronous processing between the first database and the second database in accordance with detection of a delay with respect to one or more of first processing requests, each of the one or more of first processing requests being a request received by the first database from a first computer, the first computer being configured to execute application program to provide a service to a user in accordance with a response to the each of the one or more of first processing requests, the synchronous processing being processing caused in response to the one or more of first processing requests,
   transmit an error notification to the first computer, the error notification indicating one or more of second processing requests from among the one or more of first processing requests, each of the one or more of second processing requests being a processing request corresponding to the concerning uncompleted synchronous processing in the first database due to the stop of synchronous processing, the error notification being configured to cause the first computer to retransmit the one or more of second processing requests, and
   allocate the one or more of second processing requests received after the detection to the second database.

2. The management apparatus according to claim 1, wherein
   the transmitting of the error notification is configured to transmit the error notification after the stop of the synchronous processing.

3. The management apparatus according to claim 1, the processor further configured to: allocate received another processing request more preferentially to the first database than the second database before the detection of the delay.

4. The management apparatus according to claim 1, wherein
   the detection of the delay is performed in accordance with processing-related parameters stored in the memory, and
   the processor is further configured to:
   perform acquisition of delay information concerning a state of the delay upon the detection of the delay, and
   perform, on the basis of the acquired delay information, update of the processing-related parameters.

5. The management apparatus according to claim 4, wherein
   the processing-related parameters include a timeout time for processing in the first database, and the delay is detected when processing with respect to any of the plurality of first processing requests is not completed within the timeout time.

6. The management apparatus according to claim 5, wherein
the delay information includes an occurrence time of the delay in the first database, and
the update of the processing-related parameters is configured to update the timeout time to be equal to or longer than the occurrence time.

7. The management apparatus according to claim 4, wherein
the acquisition of the delay information is configured to transmit a request for monitoring to the first database, and
acquire the delay information transmitted from the first database in response to the request for monitoring.

8. The management apparatus according to claim 1, wherein
the transmitting of the error notification is configured to transmit the error notification to an application which is a request source of the one or more of first processing requests, and the one or more of second processing requests include a processing request retransmitted from the application after the transmission of the error notification.

9. The management apparatus according to claim 3, wherein
the allocating is configured to allocate a processing request to any of the first database or the second database in accordance with destination information, the destination information being configured to indicate the first database before the detection of the delay, and
the stop of the synchronous processing includes updating the destination information from the first database to the second database.

10. The management apparatus according to claim 9, wherein
the updating of the allocation information is configured to be performed before the error notification is transmitted to the first computer.

11. The management apparatus according to claim 9, the processor further configured to: stand by for, until the updating of the allocation information is completed, allocation of a third processing request received after the detection of the delay and before the updating of the allocation information is completed.

12. A management method executed by a computer configured to manage a first database and a second database synchronized with each other, the management method comprising:
stopping synchronous processing between the first database and the second database in accordance with detection of a delay with respect to one or more of first processing requests, each of the one or more of first processing requests being a request received by the first database from a first computer, the first computer being configured to execute application program to provide a service to a user in accordance with a response to the each of the one or more of first processing requests, the synchronous processing being processing caused in response to the one or more of first processing requests;
transmitting an error notification to the first computer, the error notification indicating one or more of second processing requests from among the one or more of first processing requests, each of the one or more of second processing requests being a processing request corresponding to the uncompleted synchronous processing in the first database due to the stop of synchronous processing, the error notification being configured to cause the first computer to retransmit the one or more of second processing requests; and
allocating the one or more of second processing requests received after the detection to the second database.

13. The management method according to claim 12, wherein
the transmitting of the error notification is configured to transmit the error notification after the stopping of the synchronous processing is performed.

14. The management method according to claim 12, further comprising: allocating received another processing request more preferentially to the first database than the second database before the detection of the delay.

15. A non-transitory computer-readable medium storing a management program that causes a computer to execute a process comprising:
stopping synchronous processing between a first database and a second database in accordance with detection of a delay with respect to one or more of first processing requests, each of the one or more of first processing requests being a request received by the first database from a first computer, the first computer being configured to execute application program to provide a service to a user in accordance with a response to the each of the one or more of first processing requests, the synchronous processing being processing caused in response to the one or more of first processing requests, the first database and the second database being configured to be synchronized with each other;
transmitting outputting an error notification to the first computer, the error notification indicating one or more of second processing requests from among the one or more of first processing requests, each of the one or more of second processing requests being a processing request corresponding to the uncompleted synchronous processing in the first database due to the stop of synchronous processing, the error notification being configured to cause the first computer to retransmit the one or more of second processing requests; and
allocating the one or more of second processing requests received after the detection to the second database.

* * * * *